US012512092B1

(12) United States Patent
Tu et al.

(10) Patent No.: US 12,512,092 B1
(45) Date of Patent: *Dec. 30, 2025

(54) ACCESSING ACCOUNT DATA BASED ON ACCESS TOKENS

(71) Applicant: Amazon Technologies, Inc., Seattle, WA (US)

(72) Inventors: Qiang Tu, Redmond, WA (US); Lucun Cai, Bellevue, WA (US); David Jason Jones, Burlingame, CA (US); Matthew Douglas Hasten, Seattle, WA (US); Santhoshi Jagadeeshan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 708 days.

This patent is subject to a terminal disclaimer.

(21) Appl. No.: 17/706,246

(22) Filed: Mar. 28, 2022

(51) Int. Cl.
G10L 15/22 (2006.01)
G10L 15/08 (2006.01)
H04L 9/32 (2006.01)
H04L 65/1104 (2022.01)

(52) U.S. Cl.
CPC .............. *G10L 15/08* (2013.01); *G10L 15/22* (2013.01); *H04L 9/3213* (2013.01); *H04L 65/1104* (2022.05); *G10L 2015/223* (2013.01)

(58) Field of Classification Search
None
See application file for complete search history.

(56) References Cited

U.S. PATENT DOCUMENTS

| 9,491,155 | B1 | 11/2016 | Johansson et al. |
| 10,389,726 | B2 * | 8/2019 | Chen .................. G06Q 20/3223 |
| 10,580,405 | B1 * | 3/2020 | Wang ...................... G10L 15/30 |
| 10,769,101 | B2 * | 9/2020 | Goenka .............. G06F 21/6209 |
| 11,070,644 | B1 * | 7/2021 | Teng ..................... H04L 67/306 |
| 11,114,090 | B1 * | 9/2021 | Hertschuh ........... G10L 15/1822 |
| 11,228,624 | B1 * | 1/2022 | Oueslati .............. H04L 65/1069 |
| 11,373,000 | B1 | 6/2022 | Babani et al. |
| 11,516,221 | B2 * | 11/2022 | Alsina .................. H04L 63/105 |

(Continued)

OTHER PUBLICATIONS

Tu et al., U.S. Appl. No. 17/706,345, "Action Execution Using Account Data Based on Access Tokens," Filed Mar. 28, 2022, 80 pages.

Primary Examiner — Seong-Ah A Shin
(74) Attorney, Agent, or Firm — Kilpatrick Townsend & Stockton LLP

(57) ABSTRACT

Techniques for generating and associating accounts in support of communication sessions are described. In an example, a system receives, from a first device, input data indicating that an action is requested, the input data associated with a first account. The system determines that a second account is to perform the action and enables generation of the second account using first data that indicates the first account. The system receives a first access token associated with the first account and a second access token associated the second account and stores, in the first account, second data that comprises the second access token. The system receives third data associated with establishing a communication session. The third data indicates a third account associated with the action. The system enables establishment of the communication session with the first device and a second device associated with the third account.

20 Claims, 16 Drawing Sheets

(56) References Cited

U.S. PATENT DOCUMENTS

| | | | |
|---|---|---|---|
| 2014/0095173 A1* | 4/2014 | Lynch | G06F 3/167 704/275 |
| 2014/0164597 A1* | 6/2014 | Dahan | G10L 15/22 709/224 |
| 2015/0143221 A1* | 5/2015 | Ahuja | G06Q 50/01 715/230 |
| 2015/0169336 A1* | 6/2015 | Harper | G06Q 30/0277 715/706 |
| 2015/0215261 A1* | 7/2015 | Zhang | G06Q 10/10 709/206 |
| 2017/0196031 A1 | 7/2017 | Elad et al. | |
| 2018/0353073 A1* | 12/2018 | Boucher | A61B 5/05 |
| 2019/0378519 A1* | 12/2019 | Dunjic | G06F 21/606 |
| 2020/0194004 A1* | 6/2020 | Bates | H04L 67/125 |
| 2020/0380983 A1* | 12/2020 | Sundaram | G16Y 40/35 |
| 2021/0081947 A1 | 3/2021 | Hockey et al. | |
| 2021/0084032 A1* | 3/2021 | Ding | G06F 9/54 |

\* cited by examiner

ACCESSING ACCOUNT DATA BASED ON ACCESS TOKENS

BACKGROUND

Speech recognition systems enable users to interact with computing devices using their voices as one type of modality. Voice-based modalities can employ what is referred to as near-field voice recognition, in which a user speaks into a microphone located on a hand-held device. Other voice-based modality systems employ far-field voice recognition, in which a user can speak to a device while the user is within the general vicinity of the device, e.g., within the same room but not necessarily in close proximity to or even facing the device.

BRIEF DESCRIPTION OF THE DRAWINGS

For a more complete understanding of the present disclosure, reference is now made to the following description taken in conjunction with the accompanying drawings.

DETAILED DESCRIPTION

Figure 1:
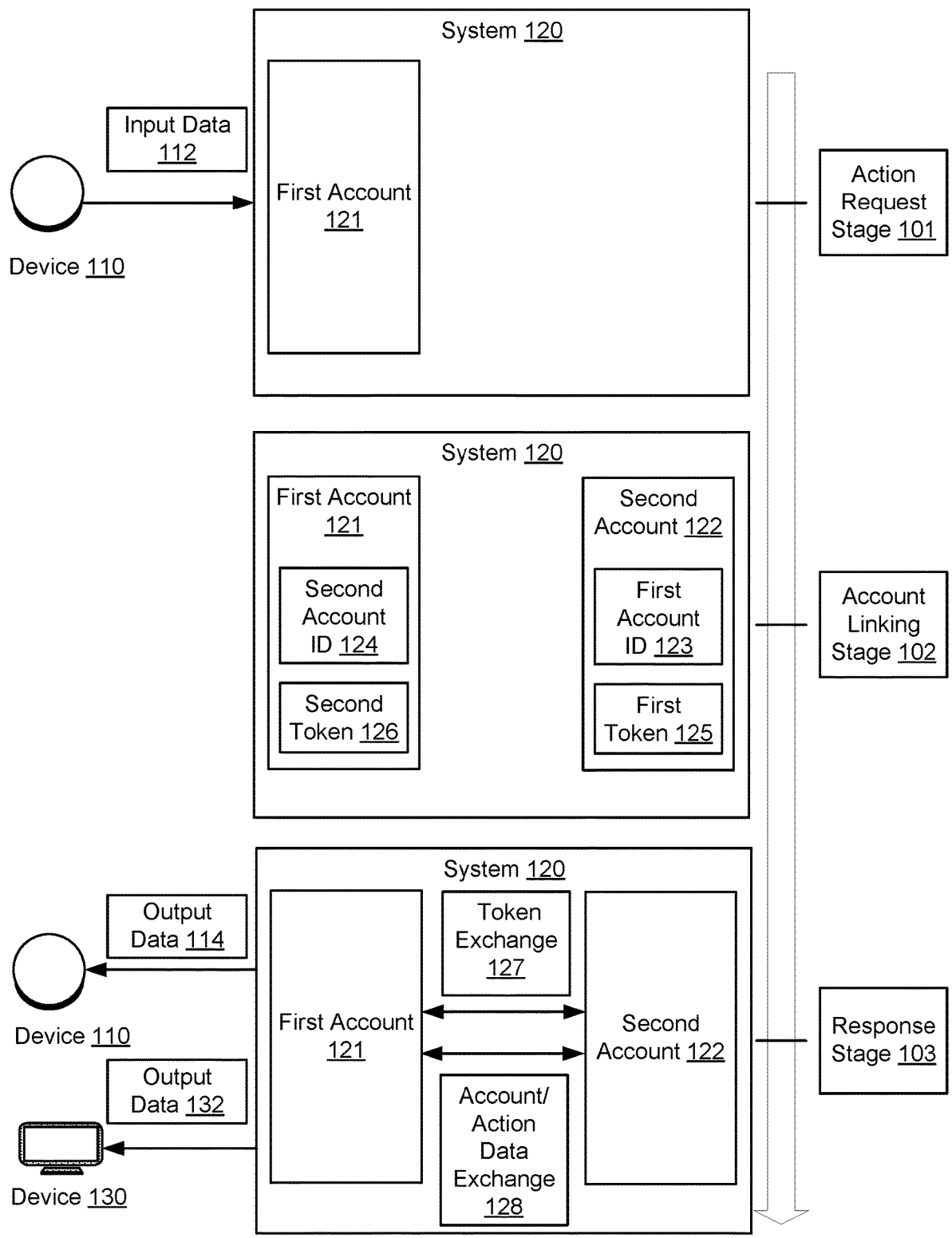
FIG. 1 illustrates an example of data partitioning to enable an action, in accordance with embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, access control-based data partitioning that enables an action to be executed by using data from the different data partitions according to the access controls. For example, a first device is operated by a first user that has a first account (e.g., a first data partition on a system). Upon input of the first user at the first device requesting an action, the system receives input data from the first device indicating the action. The system can determine that the execution of the action involves calling multiple function. A first function can execute using data stored in the first account. However, the execution of a second function may require another account (e.g., another data partition that has a different access control than the first data partition). Based on determining that no such account exists, the system can generate a second account and associate the two accounts. The account association can include storing, in the second account, a first identifier of the first account and a first token associated with access to the first account. The account association can include also storing, in the first account, a second identifier of the second account and a second token associated with access to the second account. As such, the two accounts are mutually associated (referred to herein as mutual account linking), where the creation of the second account and the mutual account linking are triggered by the input data of the first device. The second function can be executed by using the first token to access relevant data of the first account. Furthermore, output data of the execution of the first function can be stored in the second account for use by the second function, where the first function can use the second token to cause the data storing. As such, both accounts can be used based on the mutual account linking and the token to execute the different functions called by the execution of the action.

To illustrate, consider an example of a telehealth use case. A first user has a first account with a first computer system that includes a natural language processing (NLP) system (e.g., a system that processes natural language input data) and a communication system (e.g., a system that establishes a communication session between devices and process audio, video, and/or images exchanged between the devices). However, the first user does not have a second account with a second computer system that provides a telehealth function (e.g., video conferencing with a telehealth provider, such as a doctor). The first user operates a smart speaker and provides a spoken natural language input requesting to talk to a doctor. The smart speaker generates and sends, to the first computer system, audio data corresponding to the spoken natural language input. The NLP system performs speech processing on the audio data and determines that an action of communicating with a telehealth provider is requested. The NLP system also determines that the second computer system supports the action. Based on a look-up of the first account, the NLP system determines that the first user does not have a second account with the second computer system. Accordingly, the NLP system sends, to the second computer system, a first identifier of the first account and a first token associated with access to the first account. The second computer system generates the second account and associates the first token and the first identifier with the second account. Further, the second computer system sends, to the first computer system, an account linking request that includes, among other things, the first token and a second identifier of the second account. In turn, the NLP system determines the first account based on the first token and requests a reciprocal token. The second computer system responds with a second token associated with access to the second account. The NLP system associates the second token and the second identifier with the first account. Given that the action relates to communications with a telehealth provider, the NLP system sends a request to the second computer system for a call. The request can include the second identifier and the second token. In response, the second computer system determines the second account and its association with the first account. The second computer system also determines a third account that supports the action, where the third account is associated with a second device of a telehealth provider (e.g., a doctor). The second computer system sends, to the transport media system, a session establishment message (e.g., a session initiation protocol (SIP) message, such as a SIP invitation) that indicates the second device, the first account, and the first token. In response, the transport media system establishes a communication session between the first device and the second device and processes data (e.g., audio, video, and/or images) exchanged between the two devices.

Embodiments of the present disclosure provide many technological advantages. For example, a single user input at a device can be used as a trigger to generate a data partition, associate data partitions, and an action to be executed (e.g., establishing a communication session). In this way, using multiple applications and/or web pages on the device (e.g., a first "app" and/or a first web page of the first computer system and a second "app" and/or web page of the telehealth provider) or using multiple devices is not needed. Further, access to the data partitions can be securely managed by using tokens. These and other advantages are further described herein below.

Certain embodiments of the present disclosure may involve storing and using data associated with a person or device (e.g., user data or device data). Storage and/or use of such data may be controlled by a user using privacy controls associated with a device and/or a companion application associated with a device. Accordingly, users may opt out of storage of data and/or may select particular types of data that may be stored while preventing aggregation and storage of other types of data. Additionally, aggregation, storage, and use of data, as described herein, may be compliant with privacy controls, even if not technically subject to them, to bolster user trust. For example, data described herein may be treated as if it fell under acts and regulations, such as the Health Insurance Portability and Accountability Act (HIPAA) and the General Data Protection Regulation (GDPR), even if it does not actually fall under these acts and regulations.

In the interest of clarity of explanation, various embodiments of the present disclosure are described in connection with user accounts. However, the embodiments are not limited as such and can equivalently apply to other types of data partitions that a system may generate. Furthermore, various embodiments of the present disclosure are described in connection with user a telehealth action. However, the embodiments are not limited as such and can equivalently apply to any action that can be executed on a system based on data partitions. For instance, the action can relate to communicating with a legal service (e.g., the user requesting a lawyer and receiving a call back from a lawyer), booking a class (e.g., the user requesting a sign up for a class and receiving a response back about the sign up), organizing a trip plan (e.g., booking of travel transportation, booking housing accommodations, etc.), and any other types of actions that can be provided via a set of functions of the system. The execution of the action may, but need not, result in a communication session being established between devices.

FIG. 1 illustrates an example of data partitioning to enable an action, in accordance with embodiments of the present disclosure. Generally, a set of functions may be implemented to enable the action, where each function may rely on particular data associated with the user. In certain situations, data access policies, such as a data sensitivity policy, a data security policy, and/or a data privacy policy, can be defined for the user's data. Given the data access policies, a function may be permitted access to a subset of the user's data rather than to the entire set of data. Such an access can be managed by partitioning the user's data into data partitions, associating each data partition with one or more functions, and associating the data partitions with each other by defining access controls. The access controls can enable a first function associated with a first data partition to provide, according to the data access policies, output data of the first data partition to a second function associated with a second partition such that the second function can execute using the output data and data of the second partition. As such, when the action is requested, the set of functions are called, and the first function can execute by using first data available from a first data partition, and the second action can execute by receiving the output data of the first function and using second data of the second data partition.

In the illustrative example of FIG. 1, a user operates a device 110 to request the execution of an action by a system 120. The system 120 partitions the user's data into data partitions, shown as user accounts. A user account represents a data partition that includes data usable by a set of function. This data is referred to herein as user account data. The execution of the action follows multiple stages shown in FIG. 1 as an action request stage 101, an account linking stage 102, and a response stage 103. Each of these stages is described herein next.

During the action request stage 101, the system 120 receives input data 112 from the device 110 and calls a first function to process the input data 112. The input data 112 can indicate parameters of the action (e.g., the type of the requested action). For instance, and referring to the telehealth use case, the input data 112 can indicate a request for receiving a doctor call or scheduling a doctor appointment. The first function can be a user interface function that enables the system 120 to apply, for instance, speech processing (or any other type of data processing) on the input data 112 to determine the parameters of the action. The execution of the function can rely on first user data of a first user account 121 of the user. This first user data can include a first user identifier, a device identifier, and the like. The first account 121 is associated with a first data access policy permitting the first function and other functions (e.g., a content streaming function) to the first user data. The system 120 also determines that the execution of the action involves a second function (e.g., a communication function to establish a communication session in the case of a doctor call request, or a scheduling function to schedule a doctor appointment). A second data access policy may control the access to second user account data needed to execute the second function. This data access policy may prohibit access of the first function to the second user account data.

During the account linking stage 102, the system 120 determines whether a second user account 122 including the second user account data is already generated or not. As needed, the system 120 generates the second account 122 and stores the second user account data therein. The system 120 also associates the first account 121 and the second account 122 by defining access controls according to the first data access policy and the second data access policy. For example, the system 120 stores, in the second account 122, a first account identifier 123 that identifies the first account 121 (e.g., the first user identifier) and a first token 125. The first account identifier 123 indicates the association of the second account 122 with the first account 121, whereas the first token 125 controls the second function's access to user account data stored in the first account 121. Similarly, the system 120 stores, in the first account 121, a second account identifier 124 that identifies the second account 122 (e.g., a second user identifier) and a second token 126. The second account identifier 124 indicates the association of the first account 121 with the second account 122, whereas the second token 126 controls the first function's access to user account data stored in the second account 122.

Generally, a token can be an object that represents an authorization provided to a function to access specific data. For instance, the token is implemented as an access token generated according to open standard for access delegation, such as OAuth. The access token can be authorization data to access the user account on behalf of the user. In this case, the first token 125 represents the authorization of the second function to access particular user account data stored in the first account 121 (e.g., to have access to the device identifier, but not to a user location identifier), to make changes to the first account 121, and/or to send, to the first function, output data related to the first account 121. Similarly, the second token 126 represents the authorization of the first function to access particular user account data stored in the second account 122 (e.g., to have access to second user identifier, but not to health record data of the user), to make changes to the second account 122, and/or to send, to the second function, output data related to the second account 122. In this way, each of the two functions can make a request (e.g., an application programming interface (API) call) to the other function by using the permitted user account data.

During the response stage 103, the second function is executed based on the account linking and the first function may be further executed also based on the account linking. The execution of the second function and/or the first function can involve a token exchange 127 and account/action data exchange 128 between the two functions depending on the type of the requested function. As a result, the requested function is executed and the system 120 may send output data to one or more devices.

To illustrate, consider three action types: a request for an outbound call to a doctor, a request for an inbound call from a doctor, and a request to schedule an appointment. For the outbound call, the first function can use the second token 126 stored in the first account 121 to request and receive from the second function a device identifier of a device 130 operated by a doctor. To do so, the first function sends, in an API call, the second token 126 to the second function (e.g., as part of the token exchange 127) along with a request to identify a device for the outbound call (e.g., as part of the account/action data exchange 128). The second function determines the device identifier that can be used in association with the second account 122 and sends this device identifier in an API response to the first function (e.g., as part of the account/action data exchange 128). Next, the first function (or a communication function that interfaces with the first function) can initiate a communication session between the device 110 and the device 130 by using the device identifier of the device 110 stored in the first account 121 and the device identifier of the device 130 received from the second function. The system 120 can manage the communication session and send output data 114 to the device 110 based on incoming data from the device 130 and send output data 132 to the device 130 based on incoming data from the device 110.

For the inbound call, the first function can use the second token 126 stored in the first account 121 to request the inbound call, and the second function can use the first token 125 stored in the second account 122 to request and receive from the first function the device identifier of the device 110 operated by the user. To do so, the first function sends, in an API call, the second token 126 to the second function (e.g., as part of the token exchange 127) along with a request for the inbound call (e.g., as part of the account/action data exchange 128). In turn, the second function determines the device identifier of the device 130 that can be used as a source of the inbound call, and sends, in an API call, the first token 125 to the first function (e.g., as part of the token exchange 127) along with a request for the device identifier of the device 110 (e.g., as part of the account/action data exchange 128). Upon receiving device's 110 identifier, the second function (or a communication function that interfaces with the second function) can initiate a communication session between the device 110 and the device 130 by using the device identifiers, such that the system 120 can manage the communication session and send output data 114 to the device 110 based on incoming data from the device 130 and send output data 132 to the device 130 based on incoming data from the device 110.

For scheduling the appointment, the first function can use the second token 126 stored in the first account 121 to request the appointment, and the second function can use the first token 125 stored in the second account 122 to indicate that the appointment has been scheduled. To do so, the first function sends, in an API call, the second token 126 to the second function (e.g., as part of the token exchange 127) along with a request for the appointment (e.g., request a date as part of the account/action data exchange 128). In turn, the second function identifies the second account 122, schedules the appointment in association with the second account 122, and sends, in an API call, the first token 125 to the first function (e.g., as part of the token exchange 127) along with an indication that the appointment as been made (e.g., a data confirmation as part of the account/action data exchange 128). Next, the first service updates the first account 121 to indicate that the appointment has been made and can send the output data 114 to the first device to present the confirmation to the user.

Figure 2:
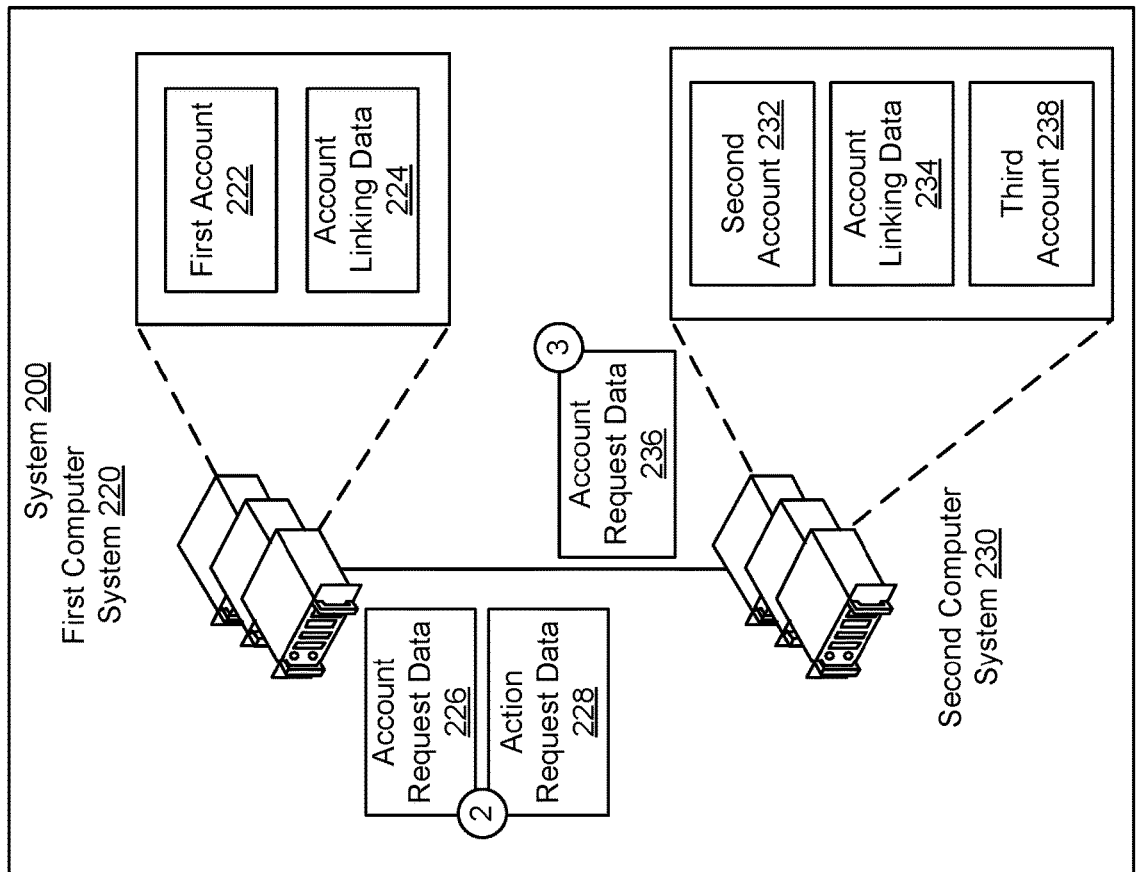
FIG. 2 illustrates an example of a system that enables account associations in support of device communication sessions, in accordance with embodiments of the present disclosure.
Figure 2:
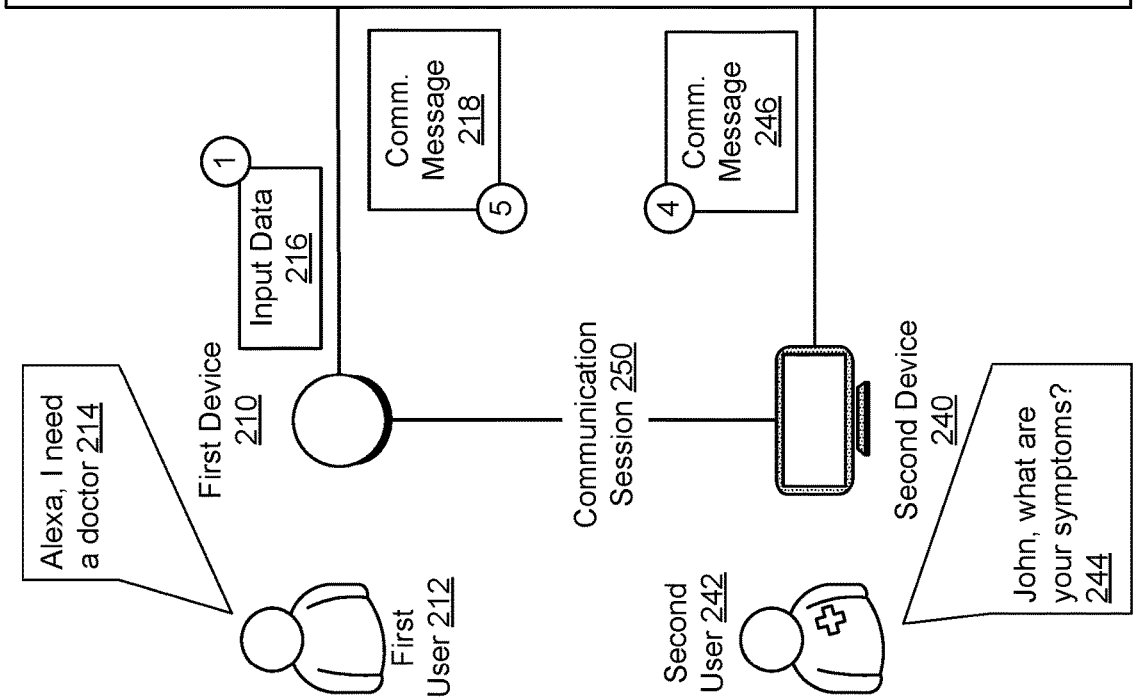

FIG. 2 illustrates an example of a system 200 that enables account associations in support of device communication sessions, in accordance with embodiments of the present disclosure. The system 200 interfaces with a first device 210 and a second device 240 and includes a first computer system 220 and a second computer system 230. The system 200 is an example of the system 120 of FIG. 1. In particular, the system supports a user interface function for processing of input data received from the first device 210, a communication function for establishing a communication session between the first device 210 and the second device 240, and a third function related to enabling an action (e.g., a telehealth action, such as communicating with a doctor, scheduling an appointment, and the like). The user interface function and the communication function are implemented on the first computer system 220 and are executed for a user based on a first account stored by the first computer system 220. In comparison, the third function is implemented on the second computer system 230 and is executed for the user based on a second account stored by the second computer system 230. The two accounts represent data partitions that have different access controls. The two accounts are also associated with each other to enable the execution of the action, where the execution involves calling the three functions.

In an example, user input can be received at the first device 210 requesting an action to be executed. The first device 210 sends input data corresponding to the user input to the first computer system 220. Based on the input data, the first computer system 220 causes the second computer system 230 to generate an account (if not already generated) and associate this account with another account stored by the first computer system 220. The first computer system 220 also associates the two accounts. Executing the action can involve the second computer system 230 determining the second device 240 and indicating this determination to the first computer system 220. In turn, the first computer system 220 can establish a communication session between the first device 210 and the second device 240. As such, responsive to the user input at the first device 210, an account can be generated and linked with another account and a communication session can be established.

The data flow between the devices and computer systems are shown in FIG. 2 with a circle that includes a numeral. The sequence of the data flow follows the ascending order of the numerals. In an example, the first device 210 is operated by a first user 212 that has a first account 222 with the first computer system 220. Based on the first account 222, the user 212 may request, via the first device 210, an action to be performed (e.g., illustrated as a spoken natural language input 214 of "Alexa, I need a doctor"), where the first device 210 sends (1), to the first computer system 220, input data 216 (e.g., audio data) indicating the request such that the first computer system 220 can trigger the execution of the action. The action (e.g., communicating with a telehealth provider) is executable by the second computer system 230 upon the first user 212 having a second account 232 with the second computer system 230.

In response, the first computer system 220 (e.g., the user interface function) can determine that the second computer system 230 is configured to execute the action, where the execution necessitates an account therewith. The first computer system 220 (e.g., the user interface function) also determines that the second account 232 has not already been generated by the second computer system 230 (or, if already generated, has not been linked yet with the first account 222). Accordingly, the first computer system 220 (e.g., the user interface function) sends (2), to the second computer system 230, account request data 226 and action request data 228, where the account request data 226 and action request data 228 can be sent simultaneously, sequentially, or at different times. The account request data 226 can indicate that the second account 232 is to be generated (if not already generated) and linked with the first account 222. For instance, the account request data 226 can include a first identifier of the first account 222 and, as further described herein below, a first token that enables the second computer system 230 (e.g., the third function) to access particular data stored in the first account 222 on behalf of the first user 212. The action request data 228 can indicate parameters that define the action that is to be executed.

In response, the second computer system 230 (e.g., the third function) generates (if not already generated) the second account 232 and sends (3) account request data 236 to the first computer system 220. The account request data 236 can indicate the second account 232 and that the first account 222 is to be linked with the second account 232. For instance, the account request data 236 can include a second identifier of the second account 232 and, as further described herein below, the first token and a second token that enables the first computer system 220 to access particular data stored in the second account 232 on behalf of the first user 212. Additionally, the second computer system 230 generates and stores account linking data 234 that represents a first association between the first account 222 and the second account 232. For instance, the account linking data 234 can include the first identifier, the first token, the second identifier, and the second token and can be stored as data of the second account 232.

Similarly, upon receiving the account request data 236, the first computer system 220 generates and stores account linking data 224 that represents a second association between the first account 222 and the second account 232. For instance, the account linking data 224 can include the first identifier, the first token, the second identifier, the second token, and an identifier of the second computer system 230 (or a component thereof) and can be stored as data of the first account 222.

Tokens are described herein as a mechanism used in linking accounts and in accessing resources (e.g., the first token can be used by the second computer system 230 to access the first account 222, and the second token can be used by the first computer system 120 to access the second account 232). In at least some examples, an open standard for access delegation, such as OAuth, may be used to grant a system access to its information on other systems without divulging passwords. Such access delegation process may allow a user of one system to share the user's information about their account with another system. For example, OAuth may provide a secure delegated access to system resources on behalf of the system. More specifically, OAuth provides a process by which the first computer system 220 may authorize access of the second computer system 230 to the first computer system's 220 resources without the first computer system 220 sharing its credentials. Such may be enabled through the use of tokens. A token is issued by the first computer system 220 to the second computer system 230. The second computer system 230 may use the token to access protected resources of the first computer system 220 with the first computer system's 220 approval. Likewise, OAuth provides a process by which the second computer system 230 may authorize access of the first computer system 220 to the second computer system's 230 resources without the second computer system 230 sharing its credentials. In an example, OAuth 2.0 with an authorization code grant type can be used by one or both of the first computer system 220 and the second computer system 230. Nonetheless, other linking and/or access mechanisms can be used. For instance, a username and credential (e.g., a password, a digital certificate, etc.) can be used instead of a token.

Based on the action request data 228, the second computer system 230 initiates the execution of the action. In an example, the action corresponds to a communications request (e.g., with a telehealth provider) and, as such, the execution thereof can necessitate a communication session to be established. In this example, the second computer system 230 determines a third account 238 that supports the action (e.g., an account of a second user 242, such as a telehealth provider) and that the second device 240 is associated with the third account 238. The computer system 230 then indicates the second device 240 and/or the third account 238 to the first computer system 220. In response, the first computer system 220 establishes a communication session 250 between the first device 210 and the second device 240, such that the first user 212 and the second user 242 can communicate via a voice call, a video call, text messages, voice messages, or any other type of communications depending on the type of the communication session 250. In FIG. 2, a voice call is illustrated, where audio input of the second user 242, shown as "John, what are your symptoms?" is received at the second device 240 and sent as audio data to the first device 210 for output at a speaker thereof. Conversely, audio input of the first user 212 is received at the first device 210 and sent as audio data to the second device 240 for output at a speaker thereof. Establishing the communication session can include the first computer system 220 (e.g., the communication function) receiving (4) a first communication message 246 (e.g., a first session initiation protocol (SIP) invitation) from the second device 240 and sending (5) a second communication message (e.g., a second SIP invitation) to the first device 210, determining a routing path, and setting up the communication session as further described in the next figures.

In another example, the action need not correspond to a communications request and may not necessitate a communication session with the first device 210. Instead, the action can be handled by the third function of the second computer system 230 and a result of the action's execution can be sent by the third function to the first device 210 via a push or a pull mechanism and/or the third function can use the first token to access and update the first account, where the update indicates the result. For instance, the action can be to schedule an appointment, to change an appointment, or any other type of actions. The third function can be an appointment function that the second computer system 230 supports.

Regardless of the type of action, the mutual account linking allows the first computer system 220 to request the action based on the second account 232 and the second computer system 230 to execute the action based on the first account 222. For example, the action request data 228 can include the second token, such that the first computer system 220 can call the third function of the second computer system 230 on behalf of the first user 212. When requesting a communication session in response to the action request data 228, the second computer system 230 can include the first token in such a request, such that the third function of the second computer system 230 can call the communication function of the first computer system 220 on behalf of the first user 212. Similarly, for other types of actions that may use a pull or push mechanism and/or an update to the first account, the push mechanism, pull mechanism, and/or the update can be requested by the third function of the second computer system 230 from the user interface function of first computer system 220, whereby the third function sends the first token to the user interface function.

Other variations exist. For example, the second computer system 230, rather than the first computer system 220, may establish a communication session between the first device 210 and the second device 240. In another example, the second computer system 230 may provide a push mechanism and/or a pull mechanism directly to the first device 210.

Examples of the first device 210 and/or second device 240 include a smart phone, a tablet, a laptop computer, a desktop computer, a smart speaker, a wearable device, a smart set top box, a smart television, a smart appliance, an Internet of Things (IoT) device, a device of a vehicle infotainment system, and the like. Generally, a device (e.g., any of the first device 210 or the second device 240) can include one or more processors and one or more memory that store computer-readable instructions that, upon execution by the one or more processors, configure the device to perform operations including communications with other devices and/or with one or more computer systems as described herein.

In comparison, the first computer system 220 can be operated by a service provider and implemented as hardware (e.g., a set of hardware servers) or software hosted on hardware (e.g., a cloud-based service) suitable for communication with devices over one or more data networks. As further illustrated in the next figures, the first computer system 220 can include an NLP system that provides the user interface function and a communication system that provides the communication function. The second computer system 230 can be operated by the service provider or another entity (e.g., a telehealth entity). Generally, a computer system (e.g., any of the first computer system 220 or the second computer system 230) includes one or more processors and one or more memory that store computer-readable instructions that, upon execution by the one or more processors, configure the computer system to perform operations including communications with other computer systems and/or with one or devices as described herein.

In an example, the first account 222 stores first user account data according to a first data access policy. This policy can permit multiple functions to have access to the first user account data (e.g., the user interface function, the communication function, a content streaming function, etc.) given the sensitivity, privacy, security, and/or user permission associated with the first user account data. In comparison, the second account 232 stores second user account data according to a second access policy. This policy can permit only other functions to have access to the second user account data (e.g., the third function) given the sensitivity, privacy, security, and/or user permission associated with the first user account data. To illustrate, and referring back to the telehealth use case, the second account 232 can store medical record data of the user that can be subject to heightened regulatory access controls (e.g., HIPAA), whereas the first account 222 can store personal identification data that can be subject to a different set of regulatory access controls (e.g., GDPR).

In another example, the first account 222 corresponds to a group account generated for a plurality of users. The group account can represent a multi-profile account that includes multiple individual user accounts, where each individual account can represent a user profile of an individual user and includes personal profile data of the corresponding user for instance. In comparison, the second account 232 can be generated for a single user of the particular users and include user account data subject to a different access control policy (e.g., referring back to the telehealth use case, the user account data can store the user's medical record data that can be subject to heightened regulatory access controls (e.g., HIPAA)). In this example, depending on the access control policy, the group account can be linked with the second account 232, a subset of the individual user accounts of the group account, and/or only the relevant individual account of the group account can be linked with the second account 232.

Conversely, the first account 222 can be an individual user account, whereas the second account 232 can be a group account. Here, depending on the access control policy, the first account 222 can be linked with the group account, one of the individual user accounts of the group account, or a subset of the individual user accounts of the group account.

Figure 3:
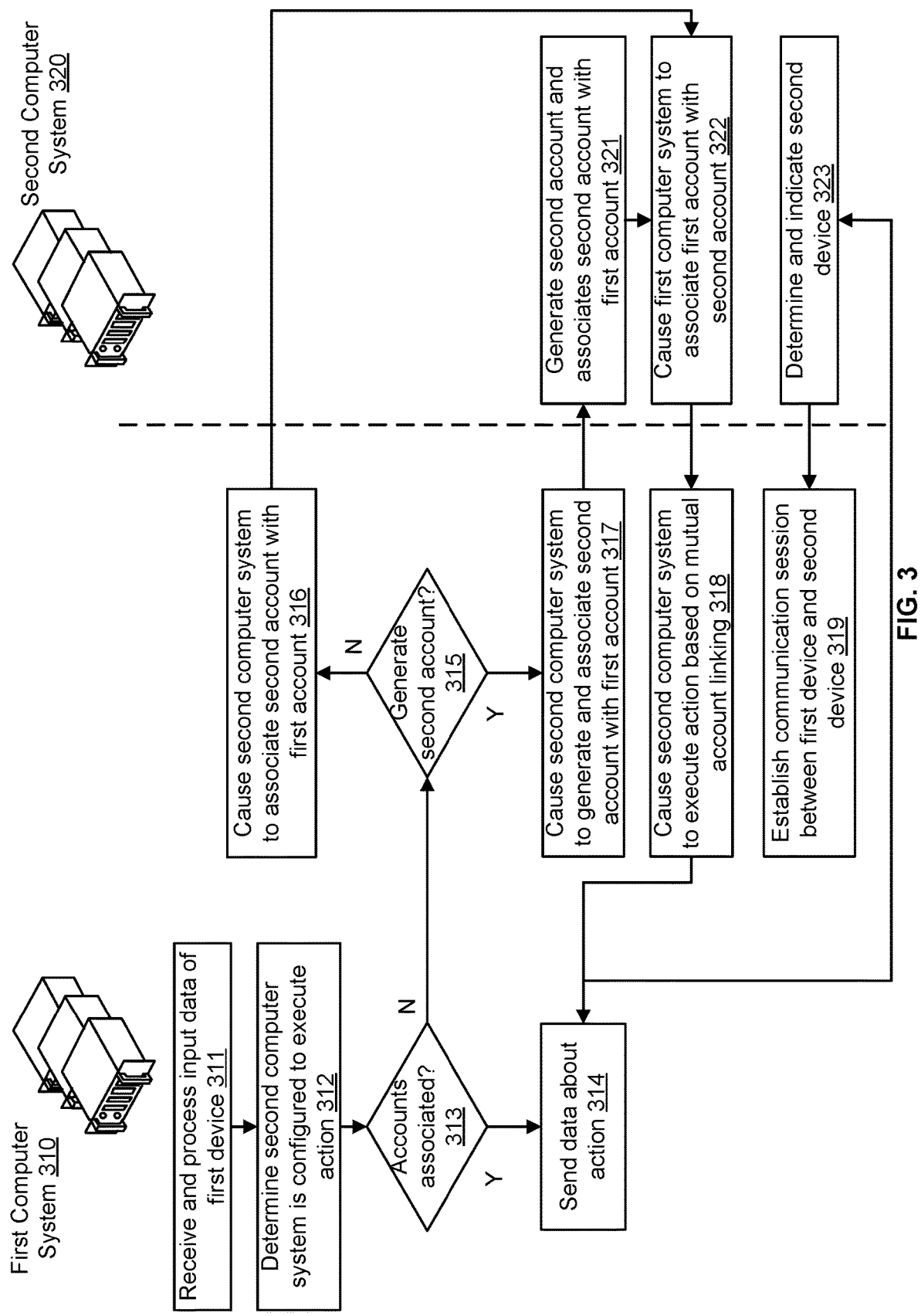
FIG. 3 illustrates an example of a diagram usable for associating accounts at two computer systems in support of device communication sessions, in accordance with embodiments of the present disclosure.

FIG. 3 illustrates an example of a diagram usable for associating accounts at two computer systems (a first computer system 310 and a second computer system 320) in support of device communication sessions, in accordance with embodiments of the present disclosure. The first computer system 310 and the second computer system 320 correspond to the first computer system 220 and the second computer system 230, respectively, of FIG. 2. Although the figures and discussion illustrate certain operations in a particular order, the operations described may be performed in a different order (as well as certain operations removed or added) without departing from the intent of the disclosure.

As illustrated, first computer system 310 receives and processes (311) input data of a first device (e.g., the first device 210 of FIG. 2). The input data can correspond to a natural language input of a user at the first device, where this input can request an action. The natural language input can be spoken audio, whereby the input data is audio data generated from the spoken audio. The natural language input can be typed text (e.g., via a chat window associated with a chatbot), whereby the input data is text data generated from the typed text. For example, a chatbot can be executed and a chat window can be presented by the first device. Text input can be received via the chat window and text output can be presented back. Additionally or alternatively, the input data can be structured data corresponding to selectable inputs presented as selectable options in predefined fields by the first device. In the case of spoken natural language input, the processing can involve speech processing of the audio data, such as automatic speech recognition (ASR) to generate text data and natural language understanding (NLU) of the text data to determine at least an intent (e.g., the requested action), or other speech processing techniques as further described herein below. In the case of typed natural language input, the processing can involve NLU of the text data to determine at least the intent (e.g., the requested action). In the case of structured input data, the processing can involve parsing the received input data based on the predefined fields to determine at least the requested action.

The first computer system 310 determines (312) that the second computer system 320 is configured to execute the action. For instance, the first computer system 310 stores system data associated with an identifier of the second computer system 320. The system data can indicate the actions that the second computer system 320 supports, as well as configuration information, such as whether the execution of the action requires an account with the second computer system 320, needed information to execute the action, endpoints of the second computer system 320, application programming interfaces (APIs), and the like. Based on the look-up of the system data, the first computer system 310 determines that the action is supported by the second computer system 320 and that an account therewith is needed for the execution of the action.

The first computer system 310 determines (313) whether accounts of the user (e.g., a first account stored by the first computer system 310 and a second account stored by the second computer system 320) are already associated. For instance, the first computer system determines whether the first account stores a second identifier of the second account and/or a second token of the second account. If so, the two accounts are already associated and the first computer system 310 sends (314) data about the action to the second computer system 320. Otherwise, the first computer system 310 determines (315) whether the second account is to be generated or not. For instance, the first computer system 310 can query the second computer system 320 to determine if the second account already exists or can determine that the first account stores the second identifier but not the second token. If the second account is already generated, the first computer system 310 causes (316) the second computer system 320 to associate the second account with the first account. For instance, the first computer system 310 sends a first identifier and a first token of the first account to the second computer system 320. If the second account is to be generated, the first computer system 310 causes (317) the second computer to generate the second account and to associate the second account with the first account. Generally, the first computer system 310 sends the first identifier and the first token to the second computer system 310 in addition to other user account data that is to be stored in the second user account. Additional data exchange can be performed, as further described in the next figures, and can indicate the action. The first token can be generated by following an OAuth process (e.g., an OAuth 2.0 with an authorization code grant type process may be executed). In particular, an authorization endpoint of the first computer system 310 can send an authorization code grant to an endpoint of the second computer system 320, receive back an authorization token request, and respond with the first token. The first token can control access to resources of the first computer system 310, including to the first account.

The second computer system 320 generates (321) the second account and associates the second account with the first account. For instance, the second computer system 320 generates a second identifier of the second account, generates an association between the first identifier and the second identifier, stores the association and the first token in the second account, and stores used account data.

The second computer system 320 causes (322) the first computer system 310 to associate the first account with the second account. Generally, the second computer system 320 sends at least a second token of the second account to the first computer system 310. Additional data exchange can be performed, as further described in the next figures, and can include, for instance, an account link request that presents the first token to the first computer system 310. The first computer system 310 can determine the first account based on the first token and associates the second token with the first account by at least storing the second token in the first account. The first computer system 310 can also generate an association between the first identifier of the first account and the second identifier of the second account and/or the identifier of the second computer system 320 and store this association in the first account. The second token can also be generated by following an OAuth process (e.g., an OAuth 2.0 with an authorization code grant type process may be executed). In particular, an authorization endpoint of the second computer system 320 can send the account link request, where this request additionally includes an authorization code grant, receives back an authorization token request from an endpoint of the first computer system 310, and respond with the second token. The second token can control access to resources of the second computer system 320, including to the second account.

The first computer system 310 causes (318) the second computer system 320 to execute the action based on the mutual account linking (e.g., the first account and the second account being associated with each other by both the first computer system 310 and the second computer system 320). Different techniques are possible and can depend on the action and/or the implementation of the second computer system 320, as further described in the next figures. In the illustrative example of FIG. 3, the action relates to establishing a communication session. In this example, the first computer system 310 can send (314) data to the second computer system 320 requesting a call to be initiated by a telehealth provider. The data can include the second token and parameters of the call (e.g., timing or any other user setting, as further described in the next figures).

The second computer system 320 determines (323) and indicates a second device to the first computer system 310. For example, the execution of the requested action may result in a communication session being established. The second computer system 320 determines the second account based on the second token included in the data and determines the first account based on its association with the first account. Further, the second computer system 320 determines the second device that needs to be a part of the communication session. This determination can be performed by looking up accounts stored by the second computer system 320 to determine a third account of a second user capable of supporting the action and to determine a device that is associated with the third account and that is operated by the second user (e.g., the second device). The second computer system 320 sends an identifier of the first account and an identifier of the second device or of the third account to the first computer system. For instance, this identifier can be sent in a communication establishment message. Additional data can be sent, such as the first token.

The first computer system 310 establishes (319) the communication session between the first device and the second device. For instance, the SIP protocol is followed, whereby the first computer system 310 may send SIP messages to the devices to establish the communication session for sending and receiving audio data and/or image data (e.g., image(s) and/or video(s)). The communication session may use network protocols, such as real-time transport protocol (RTP), RTP Control Protocol (RTCP), Web Real-Time communication (WebRTC), and/or the like to send data packets (e.g., User Datagram Protocol (UDP) data packets).

The diagram of FIG. 3 is described in connection with establishing a communication session. However, the operations of the above diagram can be modified in support of other actions that may not involve device-to-device communications. For instance, a requested action can be to schedule an appointment. In this case, operations 323 and 316 may be skipped. Instead, an appointment application executing on the second computer system 320 can generate the appointment and send, via a push mechanism or a pull mechanism, the appointment data to the first device and/or update the first account.

Furthermore, the diagram of FIG. 3 is described in connection with a single action. However, the operations of the above diagram can be repeated and/or modified in support of multiple actions. For instance, a first requested action may involve device-to-device communications and a subsequent requested action can be to schedule an appointment.

Figure 4:
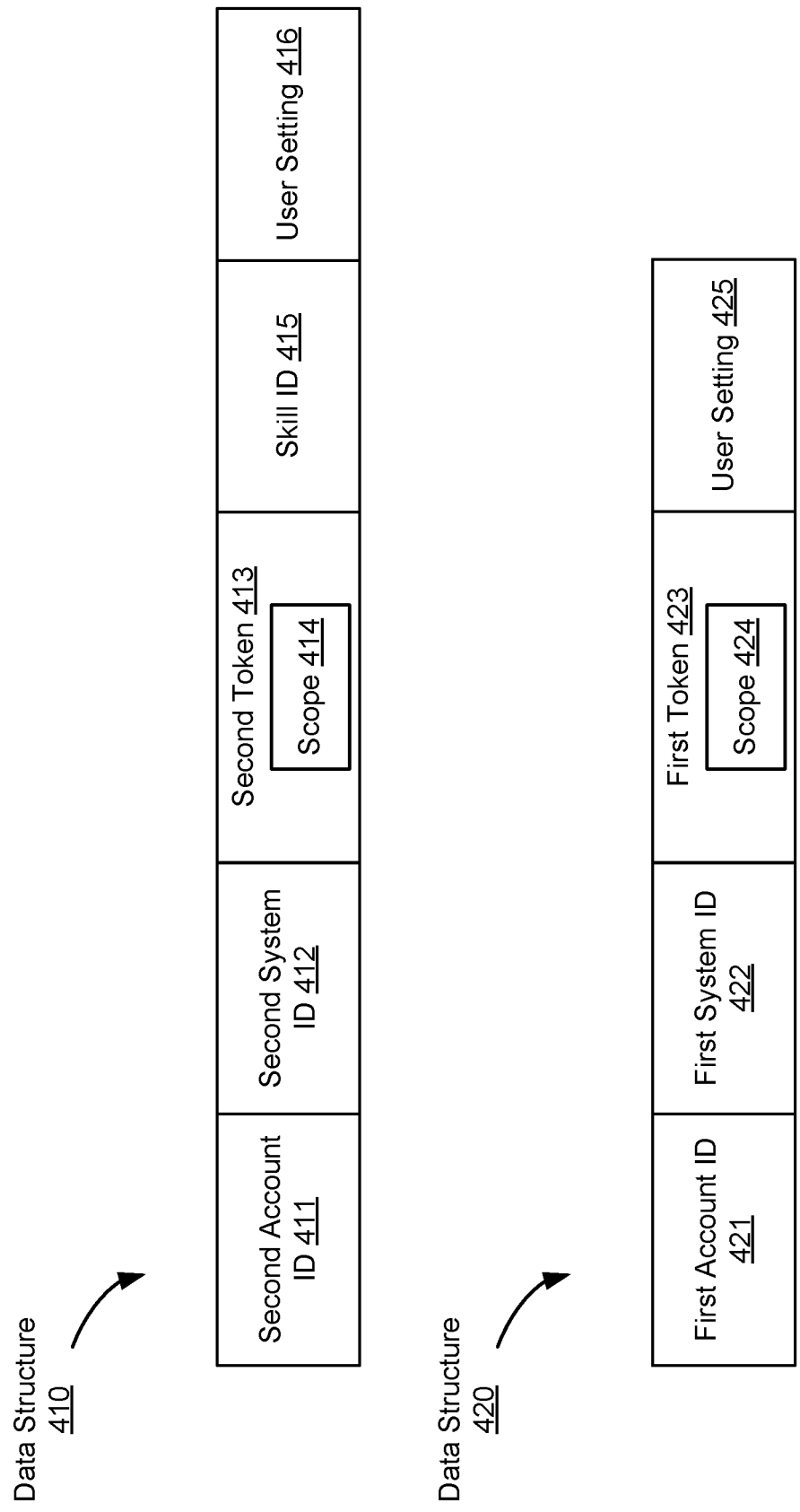
FIG. 4 illustrates an example of data structures that indicate account associations, in accordance with embodiments of the present disclosure.

FIG. 4 illustrates an example of data structures (shown as a data structure 410 and a second data structure 420) that indicate account associations, in accordance with embodiments of the present disclosure. The data structure 410 can be used by a first computer system (e.g., the first computer system 310 of FIG. 3) to store a first association between a first account with the first computer system and a second account with a second computer system. The data structure 410 can be included in and/or associated with the first account. The second data structure 410 can be used by the second computer system (e.g., the second computer system 320 of FIG. 3) to store a second association between the first account and the second account. The second data structure 410 can be included in and/or associated with the second account.

In an example, the data structure 410 stores a second account identifier (ID) 411, a second system ID 412, a second token 413, a skill ID 415 (or, more generally, an application ID), and a user setting 416. The second account ID 411 can identify the second account, whereas the second system ID 412 can identify the second computer system. The second token 413 can control access of the first computer system to one or more resources of the second computer system and can include a scope 414. The scope 414 represents a set of authorized accesses. For instance, the scope 414 can indicate a first permitted use of the second token by the first computer system in association with access to a resource(s) of the second computer system, a time period by which an access to a resource of the second computer system is permitted, and/or other resource access controls. In an example, the scope 414 is an OAuth 2.0 scope that indicates metadata associated with the second token 413, where the metadata defines the resource access controls. The skill ID 415 can identify a skill that supports an action. The user setting 416 can be defined based on input of a user that has the first account with the first computer system. In particular, the user setting 416 includes user data (e.g., including user preferences) that limits how the first account can be accessed or used by the second computer system. For instance, the user data can indicate a second permitted use of the second token by the first computer system in association with requesting one or more actions to be executed by the second computer system. As such, when the second computer system presents the second token 413 to the first computer system for accessing a resource, the scope 414 (including the first permitted use) and the user setting 416 (including the second permitted use) can be checked to determine whether the access is permitted or denied.

The data structure 420 can include similar data fields. For example, the data structure 420 stores a first account ID 421, a first system ID 422, a first token 423, and a user setting 425. The first account ID 421 can identify the first account, whereas the first system ID 422 can identify the first computer system. The first token 423 can control access of the second computer system to one or more resources of the first computer system and can include a scope 424. The scope 424 represents a set of authorized accesses. The user setting 425 can be defined based on input of the user that has the second account with the second computer system. In particular, the user setting 425 includes user data (e.g., including user preferences) that limits how the second account can be accessed or used by the first computer system. As such, when the first computer system presents the first token 423 to the second computer system for accessing a resource, the scope 424 and the user setting 425 can be checked to determine whether the access is permitted or denied.

Figure 5:
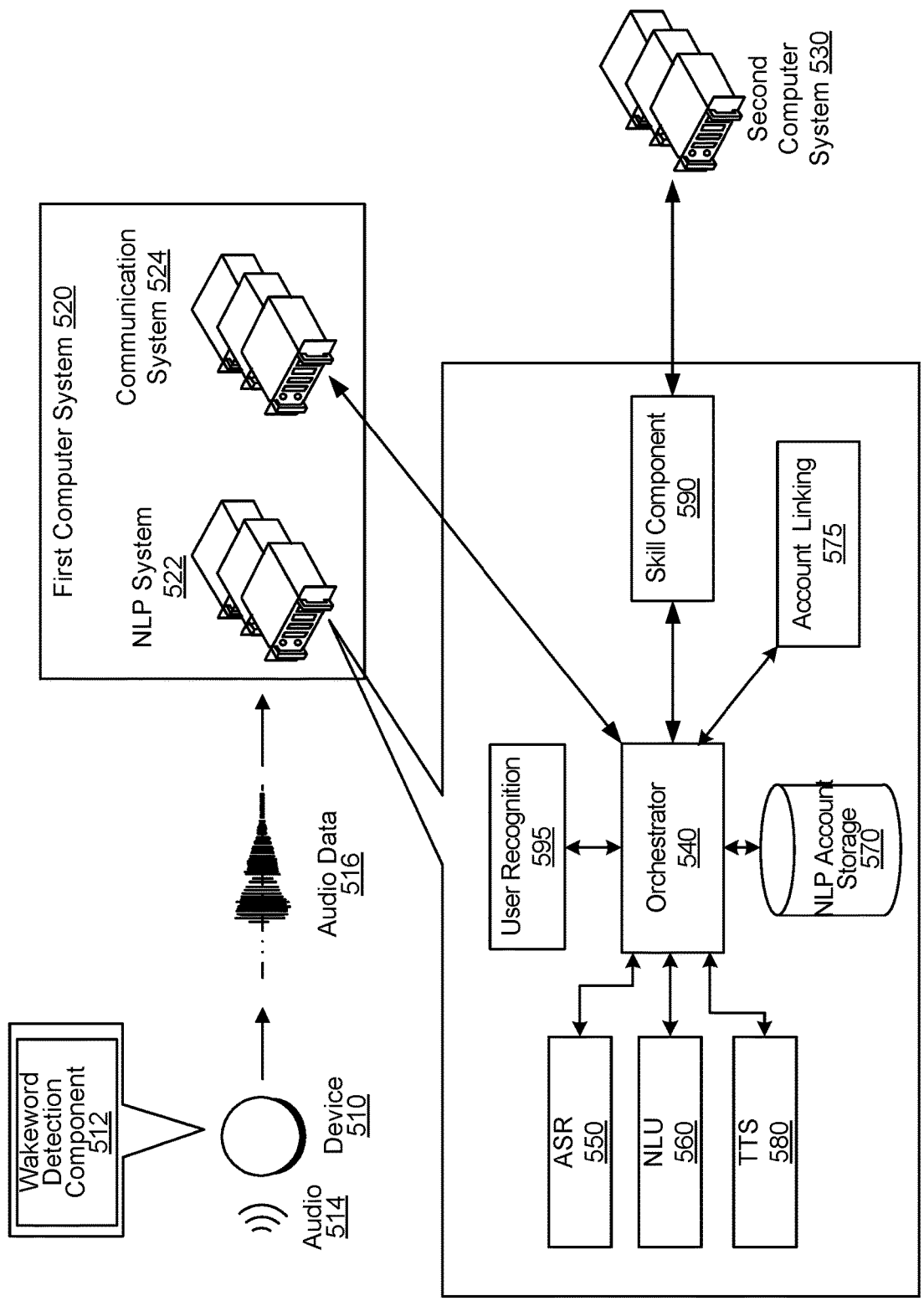
FIG. 5 illustrates an example of components of a first computer system that includes a natural language processing (NLP) system and a communication system, in accordance with embodiments of the present disclosure.

FIG. 5 illustrates an example of components of a first computer system 520 that includes an NLP system 522 and a communication system 524, in accordance with embodiments of the present disclosure. The first computer system 520 can be communicatively coupled with a second computer system 530. The first computer system 520 and the second computer system 530 are examples of the first computer system 310 and the second computer system 320, respectively, of FIG. 3. Components of the NLP system 522 are described in FIG. 5, whereas components of the communication system 524 are described in FIG. 6.

In an example, the second computer system 530 can be implemented as a skill system. A skill developer may provide, via a device, the NLP system 522 with various data for the purpose of getting the skill system approved for use during runtime processing of the NLP system 522. As used herein, a "skill developer" may refer to a user of the NLP system 522 that has specific permissions to generate and alter data to generate and alter functionality of the skill system.

In at least some examples, the skill developer may provide the NLP system 522 with data representing one or more runtime functionalities supported by the skill system. In at least some examples, there may be a one-to-one relationship between a runtime functionality and an action that may be performed in response to a natural language input.

In at least some examples, a skill developer may provide the NLP system 522 with data representing one or more of the one or more supported runtime functionalities that require a user account with the skill system (referred to as a system user account). In at least some examples, the data, representing the one or more runtime functionalities that require a system user account, may be generated in response to the skill developer activating a flag (or other indicator) presented to the skill developer via a graphical user interface.

In at least some examples, a skill developer may provide the NLP system 522 with data representing one or more NLU intents, executable by the skill system, that require a system user account. For example, a skill developer may activate, with respect to the one or more NLU intents, a flag (or other indicator), presented to the skill developer via a graphical user interface, representing the one or more NLU intents that require a system user account.

In at least some examples, a skill developer may provide the NLP system 522 with data representing one or more types of user-specific information needed by the skill system for the skill system to be able to generate a system user account. The user-specific information type(s) may include, for example, a username, email address, phone number, address, and/or user information. After the NLP system 522 receives the foregoing data from the skill developer (and more particularly a device of the skill developer), the NLP system 522 may approve the skill system for runtime processing of natural language inputs. A natural language input can be received by a device 510.

In another example, the second computer system 530 need not be a skill system. Instead, the second computer system 530 may provide a set of actions that can be invoked remotely (e.g., via API calls), where at least a subset of the actions may require an account with the second computer system 530 for execution. Information about the actions and the second computer system 530 can also be defined in a manifest (referred to herein as a "system manifest") and provided to the orchestrator 540. A system manifest can refer to a skill system manifest when the second computer system 530 is implemented as a skill system.

As illustrated in FIG. 5, the device 510 can be operated by a user to request an action supported by the second computer system 530. In particular, the device 510 may receive audio 514 corresponding to a spoken natural language input of the user. The device 510 may generate audio data 516 representing the audio 514 and may send the audio data 516 to the NLP system 522. Alternatively, the device 510 may receive text corresponding to a typed natural language input of the user. The device 510 may generate text data representing the text and may send the text data to the NLP system 522. In at least some examples, the device 510 may send the audio data or text data to the NLP system 522 using an application associated with the NLP system 522 and installed on the device 510. An example of such an application is the Amazon Alexa application.

An audio capture component(s), such as a microphone or array of microphones of the device 510, captures audio 514. The device 510 processes audio data, representing the audio 514, to determine whether speech is detected. The device 510 may use various techniques to determine whether audio data includes speech. In at least some examples, the device 510 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In at least some other examples, the device 510 may implement a limited classifier configured to distinguish speech from background noise. The classifier may be implemented by techniques, such as linear classifiers, support vector machines, and decision trees. In still other examples, the device 510 may apply Hidden Markov Model (HMM) or Gaussian Mixture Model (GMM) techniques to compare the audio data to one or more acoustic models in storage. Such acoustic models may include models corresponding to speech, noise (e.g., environmental noise or background noise), or silence. Still other techniques may be used to determine whether speech is present in audio data.

Once speech is detected in audio data representing the audio 514, the device 510 may use a wakeword detection component 512 to perform wakeword detection to determine when a user intends to speak an input to the NLP system 522. An example wakeword is "Alexa." As used herein, a "wakeword" may refer to a single word or more than one consecutive words in speech.

Wakeword detection is typically performed without performing linguistic analysis, textual analysis, or semantic analysis. Instead, the audio data, representing the audio 514, is analyzed to determine if specific characteristics of the audio data match preconfigured acoustic waveforms, audio signatures, or other data to determine if the audio data "matches" stored audio data corresponding to a wakeword.

The wakeword detection component 512 may compare audio data to stored models or data to detect a wakeword.

One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 512 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 510 may "wake" and begin transmitting audio data 516, representing the audio 514, to the NLP system 522. The audio data 516 may include data corresponding to the wakeword, or the device 510 may remove the portion of the audio corresponding to the wakeword prior to sending the audio data 516 to the NLP system 522.

An orchestrator component 540 may receive the audio data 516. The orchestrator component 540 may include memory and logic that enables the orchestrator component 540 to transmit various pieces and forms of data to various components of the system, as well as perform other operations.

The orchestrator component 540 may send the audio data 516 to an ASR component 550. The ASR component 550 transcribes the audio data 516 into text data. The text data output by the ASR component 550 represents one or more than one (e.g., in the form of an n-best list) ASR hypotheses representing speech represented in the audio data 516. The ASR component 550 interprets the speech in the audio data 516 based on a similarity between the audio data 516 and pre-established language models. For example, the ASR component 550 may compare the audio data 516 with models for sounds (e.g., subword units, such as phonemes, etc.) and sequences of sounds to identify words that match the sequence of sounds of the speech represented in the audio data 516. The ASR component 550 outputs text data representing one or more ASR hypotheses. The text data output by the ASR component 550 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The device 510 may alternatively receive a typed natural language input (e.g., in a chat window associated with a chatbot). The device 510 may generate text data representing the typed natural language input. The device 510 may send the text data to the NLP system 522. The orchestrator component 540 may receive the text data.

The orchestrator component 540 may send text data (e.g., text data output by the ASR component 550 or the received text data) to an NLU component 560. The NLU component 560 attempts to make a semantic interpretation of the phrase(s) or statement(s) represented in the received text data. That is, the NLU component 560 determines one or more meanings associated with the phrase(s) or statement(s) represented in the text data based on words represented in the text data. The NLU component 560 determines an intent representing an action that a user desires be performed as well as pieces of the text data that allow a device (e.g., the device 510, a device of the NLP system 522, a device of the second computer system 530, etc.) to execute the intent. For example, if the text data corresponds to "play Song 'XYZ'," the NLU component 560 may determine an intent that the NLP system 522 output music and may identify "XYZ" as the song. For further example, if the text data corresponds to "I need to talk to a doctor," the NLU component 560 may determine an intent to communicate with a telehealth provider.

As described above, the NLP system 522 may perform speech processing using two different components (e.g., the ASR component 550 and the NLU component 560). One skilled in the art will appreciate that the NLP system 522, in at least some examples, may implement a spoken language understanding (SLU) component that is configured to process the audio data 516 to generate NLU results data.

In some examples, the SLU component may be equivalent to the ASR component 550 and the NLU component 560. For example, the SLU component may process the audio data 516 and generate NLU results data. The NLU results data may include intent data and/or slot data. While the SLU component may be equivalent to a combination of the ASR component 550 and the NLU component 560, the SLU component may process audio data 516 and directly generate the NLU results data, without an intermediate step of generating text data (as does the ASR component 550). As such, the SLU component may take the audio data 516 representing natural language speech and attempt to make a semantic interpretation of the natural language speech. That is, the SLU component may determine a meaning associated with the natural language speech and then implement that meaning. For example, the SLU component may interpret the audio data 516 representing natural language speech from the user in order to derive an intent or a desired action or operation from the user. In some examples, the SLU component outputs a most likely NLU hypothesis recognized in the audio data 516, or multiple NLU hypotheses in the form of an N-best list with individual NLU hypotheses corresponding to confidence scores or other scores (such as probability scores, etc.).

The NLP system 522 may communicate with one or more second computer systems 530. A second computer system 530 may operate in conjunction with the NLP system 522 and other devices in order to complete certain functions. Inputs to a second computer system 530 may come from speech processing interactions or through other interactions or input sources. The NLP system 522 may also communicate with the communication system 522. For example, upon determining an intent for communications (e.g., for an action of communicating with a telehealth provider), the NLP system 522 can provide information about the intent and about the relevant second computer system to the communication system 524. The communications with the second computer system 530 and with the communication system 524 can be managed by the orchestrator 540.

The second computer system 530 may be associated with one or more domains, such as smart home, music, video, flash briefing, shopping, health, and custom (e.g., a skill not associated with any preconfigured domain).

The NLU component 560 outputs NLU results to the orchestrator component 540. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 560 in the processing performed to generate the NLU hypothesis associated with the confidence value.

The orchestrator component 540 may send the NLU results to an associated skill component 590 that is supported by the second computer system 530. If the NLU results include multiple NLU hypotheses, the orchestrator component 540 may send a portion of the NLU results corresponding to the top scoring NLU hypothesis to a skill component 590 associated with the top scoring NLU hypothesis.

A "skill" or "skill component" may be software running on the NLP system 522 that is akin to a software application running on a traditional computing device. That is, a skill component 590 may enable the NLP system 522 to execute specific functionality in order to perform one or more actions (e.g., provide information to a user, display content to a user, output music, or perform some other requested action, initiate a communication session). The NLP system 522 may be configured with more than one skill component 590. For example, a music skill may enable the NLP system 522 to initiate music streaming, a communications skill component (which may be provided in support of a telehealth skill) may enable the first computer system 520 to perform messaging or multi-endpoint communications, etc. Inputs to a skill component 590 may come from various interactions and input sources.

The functionality described herein as a skill or skill component may be referred to using many different terms, such as an action, bot, app, application, speechlet or the like. A skill component 590 may include hardware, software, firmware, or the like that may be dedicated to the particular skill component 590 or shared among different skill components 590. A skill component 590 may be part of the NLP system 522 (as illustrated in FIG. 3) or may be located at whole (or in part) with one or more separate systems (e.g., the second computer system 530).

A skill component 590 may be configured to perform one or more actions. A skill may enable a skill component 590 to execute specific functionality in order to provide data or produce some other output requested by a user. A particular skill component 590 may be configured to execute more than one skill.

A skill component 590 may implement different types of skills. Types of skills include home automation skills (e.g., skills that enable a user to control home devices, such as lights, door locks, cameras, thermostats, etc.), health skills (e.g., telehealth) entertainment device skills (e.g., skills that enable a user to control entertainment devices, such as smart TVs), video skills, flash briefing skills, gaming skills, as well as custom skills that are not associated with any preconfigured type of skill.

The NLP system 522 may include a TTS component 580. The TTS component 580 may generate audio data (e.g., synthesized speech) from text data using one or more different methods. Text data input to the TTS component 580 may come from a second computer system 530, the orchestrator component 540, or another component of the NLP system 522.

In one method of synthesis called unit selection, the TTS component 580 matches text data against a database of recorded speech. The TTS component 580 selects matching units of recorded speech and concatenates the units together to form audio data. In another method of synthesis called parametric synthesis, the TTS component 580 varies parameters, such as frequency, volume, and noise to generate audio data including an artificial speech waveform. Parametric synthesis uses a computerized voice generator, sometimes called a vocoder.

The NLP system 522 may include a user recognition component 595 that recognizes one or more users associated with data input to the NLP system 522. The user recognition component 595 may take as input the audio data 516 and/or the text data. The user recognition component 595 may perform user recognition by comparing speech characteristics in the audio data 516 to stored speech characteristics of users. The user recognition component 595 may additionally or alternatively perform user recognition by comparing biometric data (e.g., fingerprint data, iris data, etc.), received by the NLP system 522 in correlation with a user input, to stored biometric data of users. The user recognition component 595 may additionally or alternatively perform user recognition by comparing image data (e.g., including a representation of at least a feature of a user), received by the NLP system 522 in correlation with a user input, with stored image data including representations of features of different users. The user recognition component 595 may perform other or additional user recognition processes, including those known in the art. For a particular user input, the user recognition component 595 may perform processing with respect to stored data of users associated with the device 510 that captured the natural language input.

The user recognition component 595 determines whether a user input originated from a particular user. For example, the user recognition component 595 may generate a first value representing a likelihood that a user input originated from a first user, a second value representing a likelihood that the user input originated from a second user, etc. The user recognition component 595 may also determine an overall confidence regarding the accuracy of user recognition operations.

The user recognition component 595 may output a single user identifier corresponding to the most likely user that originated the natural language input. Alternatively, the user recognition component 595 may output multiple user identifiers (e.g., in the form of an N-best list) with respective values representing likelihoods of respective users originating the natural language input. The output of the user recognition component 595 may be used to inform NLU processing, processing performed by a second computer system 530, as well as processing performed by other components of the NLP system 522 and/or other systems.

In an example of user recognition, speech can be detected in frequency domain framed audio data. The user recognition component 595, performs user recognition feature extraction on the frequency domain framed audio data. User recognition feature extraction may include performing frame level feature extraction and/or utterance level feature extraction. The frame level feature extraction may determine which frame of a universal background model (UBM) the frame corresponds to. The UBM may be a Gaussian mixture model, a deep neural network, etc. The utterance level feature extraction may analyze aligned speech frames to derive feature vectors of fixed length (i.e., the user recognition feature/vector data). The feature extraction may continue until voice activity is no longer detected in the input audio data, at which point the recognition component 595 may determine that an endpoint of the speech has been reached processing with respect thereto. ASR feature extraction may be performed by the ASR component 550 on all the audio data received from the device 510. Alternatively, ASR feature extraction may only be performed on audio data including speech. ASR feature extraction and user recognition feature extraction involve determining values (i.e., features) representing qualities of the frequency domain framed audio data, along with quantitating those features into values (e.g., feature vectors or audio feature vectors). ASR feature extraction may determine ASR feature/vector data useful for ASR processing, and user recognition feature extraction may determine user recognition feature/vector data useful for user recognition.

The ASR feature/vector data and the user recognition feature/vector data may be the same features/vectors, different features/vectors, or may include some overlapping features/vectors. A number of approaches may be used to extract features/vectors from the frequency domain framed audio data, such as MFCCs, PLP techniques, neural network feature vector techniques, linear discriminant analysis, semi-tied covariance matrices, or other approaches known to those skilled in the art.

Typically, the ASR feature/vector data may include a different audio feature vector for each audio frame. Thus, for one 25 ms long audio frame, the ASR component 550 may output a single ASR feature vector. Depending on system configuration, the user recognition component 595 may output multiple user recognition feature vectors, for example one such vector for each audio frame. Alternatively, the user recognition component 595 may continue to input the frequency domain framed audio data while the utterance is ongoing (e.g., before the endpoint of the speech is reached in the audio data). While the audio data for the utterance is input, the user recognition component 595 may accumulate or otherwise combine the audio data as it comes in. That is, for a certain frame's worth of audio data that comes in, the user recognition component 595 may combine that frame's worth of data to the previous data received for the particular utterance. The particular method of accumulation may vary, including using an arithmetic component, a recurrent neural network (RNN), trained model, or other component capable of combining audio data. Further, the form of combination performed by the user recognition component 595 may depend on what audio qualities are determined to be important for ultimate user recognition. Thus, the user recognition component 595 may be trained to isolate and process data that is most useful for user recognition. The output of the user recognition component 595 may thus include user recognition feature/vector data that includes values for features useful for user recognition. The resulting user recognition feature/vector data may then be used for user recognition. The user recognition feature/vector data may include multiple vectors each corresponding to different portions of the input utterance. Alternatively, the user recognition feature/vector data may be a single vector representing audio qualities of the input utterance. The user recognition component 595 performs user recognition using various data including the user recognition feature/vector data, training data corresponding to sample audio data corresponding to known users, the ASR confidence data and secondary data.

The user recognition component 595 may then output user recognition confidence data which reflects a certain confidence that the input utterance was spoken by one or more particular users. The user recognition confidence data may include an indicator of the verified user (such as a user ID corresponding to the speaker of the utterance) along with a confidence value corresponding to the user ID, such as a numeric value or binned value as discussed below. The training data may be stored in a user recognition data storage. (e.g., in association with a user account).

The training data for a particular user may include a feature vector of the same size as a vector of the user recognition feature/vector data. Thus, for example, if a feature vector is of size F, the training data may also be a feature vector of size F. To create such a training data feature vector, during a training period the system may either prompt a user to speak sample audio data or may identify sample audio data known to have been spoken by a particular user. The system may then process the sample audio data to create sample training data (e.g., a feature vector of size F). The training data may then be stored and saved for use during runtime user recognition processing.

To perform user recognition, the user recognition component 595 may determine the device 510 from which the audio data 516 originated. For example, the audio data 516 may include a tag indicating the device 510. Either the device 510 or the NLP system 522 may tag the audio data 516 as such. The tag indicating the device 510 may be associated with the user recognition feature/vector data produced from the audio data 516. The user recognition component 595 may send a signal to the user recognition data storage, with the signal requesting only training data associated with known users of the device 510 from which the audio data 516 originated. This may include accessing a user profile associated with the device 510 and then only inputting training data associated with users associated with the device 510. This limits the universe of possible training data the user recognition component 595 should consider at runtime when recognizing a user and thus decreases the amount of time to perform user recognition by decreasing the amount of training data needed to be processed. Alternatively, the user recognition component 595 may access all (pr some other subset of) training data available to the system. However, accessing all training data will likely increase the amount of time needed to perform user recognition based on the magnitude of training data to be processed.

If the user recognition component 595 receives training data as an audio waveform, the user recognition component 595 may determine features/vectors of the waveform(s) or otherwise convert the waveform into a data format that can be used by the user recognition component 595 to actually perform the user recognition. The user recognition component 595 may then identify the user that spoke the utterance in the audio data 516 by comparing features/vectors of the user recognition feature/vector data to training features/vectors.

The NLP system 522 may include NLP account storage 570. The NLP account storage 570 may include a variety of information related to individual users, groups of users, devices, etc. that interact with the NLP system 522. A "NLP account" refers to a set of data associated with a user, group of users, device, etc. The data of a NLP account may include preferences specific to the user, group of users, device, etc.; input and output capabilities of one or more devices; internet connectivity information; user bibliographic information; subscription information; one or more email addresses; one or more phone numbers; a username; an address; as well as other information.

The NLP account storage 570 may include one or more NLP user accounts, with each NLP user account being associated with a different user identifier. Each NLP user account may include a collection of resources (e.g., files) that may be access controlled and that store various user identifying information. Each NLP user account may also include preferences of the user and/or one or more device identifiers, representing one or more devices registered to the user. Each NLP user account may include identifiers of skills that the user has enabled. When a user enables a skill (or, more generally, a skill system or a second computer system that provides a set of actions), the user is providing the NLP system 522 with permission to allow the skill to execute with respect to the user's inputs. If a user does not enable a skill, the NLP system 522 may not permit the skill to execute with respect to the user's inputs. A NLP user account may include a second account identifier (e.g., a system user account token), associated with a second computer system identifier, corresponding to a second account of the user with the second computer system.

The NLP account storage 570 may include one or more NLP group accounts. Each NLP group account may be associated with a different NLP group account identifier. A NLP group account may be specific to a group of users. That is, a NLP group account may be associated with two or more individual NLP user accounts. For example, a NLP group account may be a NLP household account that is associated with NLP user accounts associated with multiple users of a single household. A NLP group account may include preferences shared by all the NLP user accounts associated therewith. Each NLP user account associated with a NLP group account may additionally include preferences specific to the user associated therewith. That is, each NLP user account may include preferences unique from one or more other NLP user accounts associated with the same NLP group account. A NLP user account may be a stand-alone NLP user account or may be associated with a NLP group account. A NLP group account may include one or more device accounts representing one or more devices associated with the NLP group account.

The NLP account storage 570 may include one or more device accounts. Each device account may be associated with a different device identifier. Each device account may include various device identifying information. Each device account may also include one or more user identifiers, representing one or more user accounts associated with the device account (e.g., representing one or more users that can use the device). For example, a household device's account may include the user identifiers of users of the household.

In at least some examples, a second account may be generated by the second computer system 530 and linked with a NLP user account stored in the NLP account storage 570 when a user provides a natural language input instructing the NLP system 522 to enable the a functionality of the second computer system 530 (e.g., a skill thereof) with respect to the user's NLP user account stored in the NLP account storage 570. In other words, a second user account may be generated by a second computer system and linked with a NLP user account stored in the NLP account storage 570 prior to a user causing the second computer system to be invoked a first time.

In support of the account linking, the NLP system 522 may include an account linking component 575. The account linking component 575 can determine whether a user does not have a second user account with the second computer system 530 and if so, can request, via the orchestrator 540, such an account to be generated. Upon the second computer system 530 generating the requested second user account, the account linking component 575 can store receive data about such an account and stores the data in the NLP account storage in association with the corresponding NLP user account. The data can include the data included in the data structure 410 of FIG. 4 and the data structure 410 can be used in the NLP account storage 570.

Additionally, the account linking component 575 can include one or more endpoints in support of an OAuth process, such that a token of the NLP user account can be generated and sent to the second computer system 530 and a token of the second user account can be generated and sent to the NLP system 522.

Figure 6:
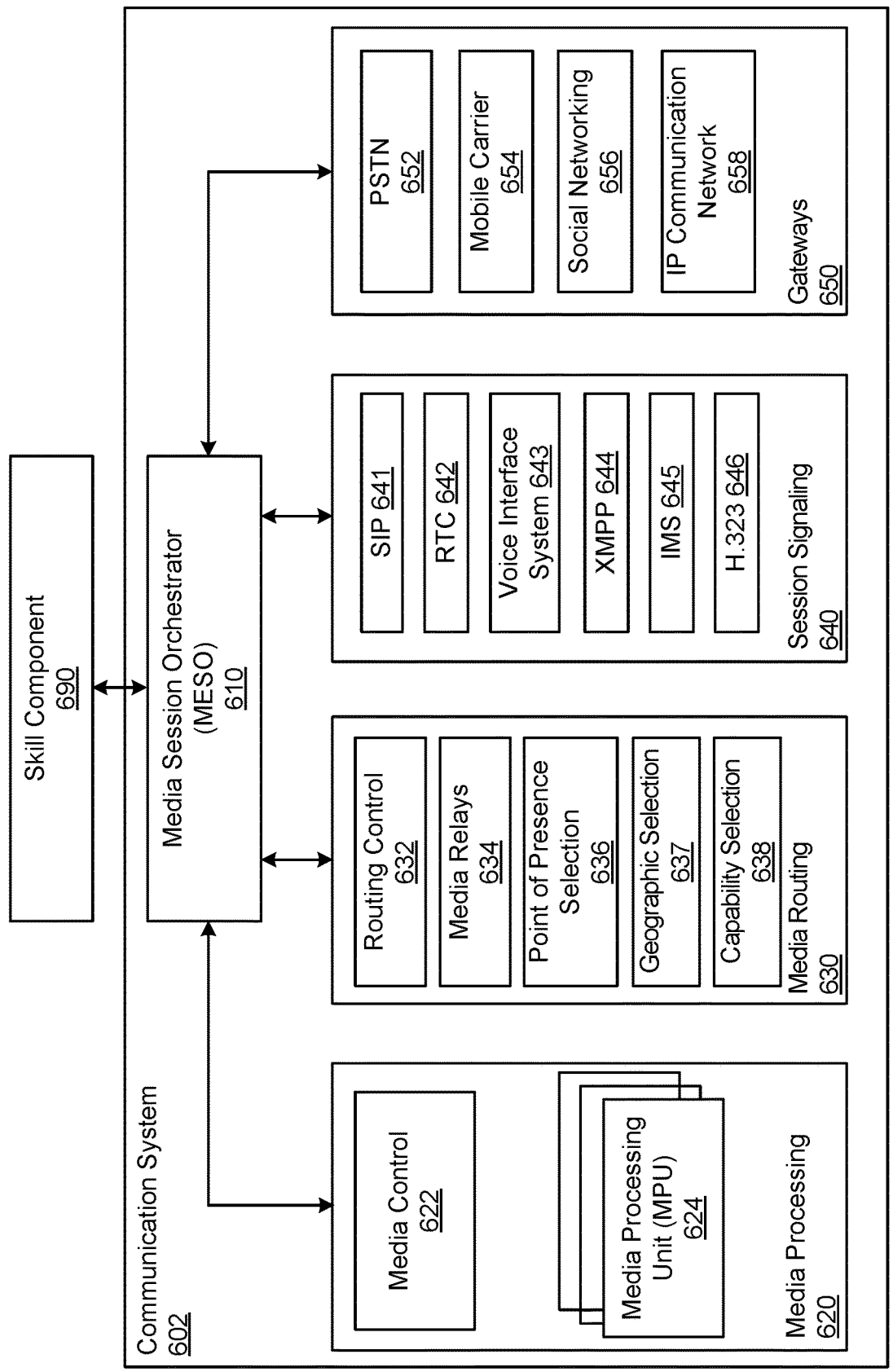
FIG. 6 illustrates an example of components of a communication system for establishing a communication session between devices, in accordance with embodiments of the present disclosure.

FIG. 6 illustrates an example of components of a communication system 602 for establishing a communication session between devices, in accordance with embodiments of the present disclosure. The communication system 602 is an example of the communication system 524 of FIG. 5.

As illustrated in FIG. 6, a skill component 690 (e.g., which may be a component of the NLP system 522, a component of the second computer system 530, or a component distributed between the NLP system 522 and the second computer system 530) may interact with a communication system 602 to request and utilize resources available within the communication system 602. For example, the skill component 690 may enable a user to interact with the communication system 602 to initiate and manage a communication session involving media processing, although the disclosure is not limited thereto.

To enable the skill component 690 to request and utilize resources from within the communication system 602, the communication system 602 may include a media session orchestrator (MESO) component 610 configured to coordinate (e.g., define, establish, manage, etc.) a communication session (e.g., media session). The MESO component 610 may also coordinate with the orchestrator 540 of FIG. 5. As illustrated in FIG. 6, the MESO component 610 may interface between components that fall within four categories: media processing components 620, media routing components 630, session signaling components 640, and/or gateway components 650.

Media processing components 620 refers to processing media content to enable unique functionality. For example, the communication system 602 may provide a hosted backend that performs media processing on individual streams of data, enabling the skill component 690 to define and control how media content is processed by the communication system 602. The media processing components 620 may correspond to real time processing (e.g., data is processed during run-time, such as while streaming video to a user, during a videoconference, and/or the like) or offline processing (e.g., data is processed and stored in a database for future requests, such as during batch processing) without departing from the disclosure.

The media processing components 620 may include at least one media control component 622 and/or at least one media processing unit (MPU) 624 (e.g., first MPU, second MPU, etc.). The media control component 622 may coordinate media processing by sending control data to and/or receiving control data from other components within the communication system 602. For example, the MESO component 610 may send a request to the media control component 622 to launch a specific application (e.g., skill, process, etc.) to perform media processing and the media control component 622 may send a command to a corresponding MPU 624.

The MPU 624 may be configured to perform media processing to enable additional functionality. Thus, the MPU 624 may receive first data and process the first data to generate second data. As part of performing media processing, the MPU 624 may perform speech processing on audio data and/or image data, perform computer vision processing on image data, modify audio data and/or image data, apply visual effects (e.g., overlay or other graphical element(s)) to image data, and/or the like to enable interesting functionality without departing from the disclosure. For example, the MPU 624 may generate subtitles (e.g., text data) corresponding to speech represented in image data, may translate the subtitles to a different language, may perform text-to-speech processing to enable additional functionality (e.g., describing visual cues for someone that is visually impaired, replacing dialog with speech in a different language, etc.), may perform voice recognition to identify voices represented in audio data, may perform facial recognition to detect and/or identify faces represented in image data, may perform object recognition to detect and/or identify objects represented in image data, may add a graphical overlay to image data (e.g., censoring portions of the image data, adding symbols or cartoons to the image data, etc.), may perform other processing to media content (e.g., colorize black and white movies), and/or the like without departing from the disclosure.

In some examples, the communication system 602 may perform media processing using two or more MPUs 624. For example, the communication system 602 may perform first media processing using a first MPU 624 and perform second media processing using a second MPU 624. To illustrate an example, a communication session may correspond to a video chat implementation that includes image data and audio data and the communication system 602 may perform media processing in parallel. For example, the communication system 602 may separate the image data and the audio data, performing first media processing on the image data and separately performing second media processing on the audio data, before combining the processed image data and the processed audio data to generate output data. However, the disclosure is not limited thereto, and in other examples the communication system 602 may perform media processing in series without departing from the disclosure. For example, the communication system 602 may process first image data using the first MPU (e.g., first media processing) to generate second image data and may process the second image data using the second MPU (e.g., second media processing) to generate output image data. Additionally or alternatively, the communication system 602 may perform multiple media processing steps using a single MPU 624 (e.g., more complex media processing) without departing from the disclosure.

The communication system 602 may include media routing components 630 that are configured to route media (e.g., send data packets) to and from devices via network(s). For example, the media routing components 630 may include one or more routing control components 632, media relay components 634, point of presence selection components 636, geographic selection components 637, and/or capability selection components 638. Examples of media relay components may include a Session Traversal of User Datagram Protocol (UDP) Through Network Address Translators (NATs) system (e.g., STUN system) and/or a Traversal Using relays around NAT (TURN) system, although the disclosure is not limited thereto. While FIG. 6 illustrates the media routing components 630 including the point of presence selection components 636, geographic selection components 637, and/or capability selection components 638 as separate components, this is for ease of illustration and the disclosure is not limited thereto. Instead, a single component may perform point of presence selection, geographic selection, and/or capability selection without departing from the disclosure.

In some examples, the communication system 602 may separate the MPUs 624 from the network(s) so that the MPUs 624 do not have a publicly accessible internet protocol (IP) address (e.g., cannot route outside of a local network). Thus, the first computer system 520 may use the media relay components 634 to send the first data from a first device to the MPUs 624 and/or the second data (e.g., processed data) generated by the MPUs 624 from the MPUs 624 to a second device. For example, an individual device 210 may be associated with a specific TURN server, such that the first computer system 520 may route data to and from the first device using a first TURN server and route data to and from the second device using a second TURN server.

While the example described above illustrates routing data to and from the media processing components 620, the media routing components 630 may be used to route data separately from the media processing components 620 without departing from the disclosure. For example, the first computer system 520 may route data directly between devices using one or more TURN servers (e.g., TURN system) without departing from the disclosure. Additionally or alternatively, the first computer system 520 may route data using one or more STUN servers (e.g., STUN system), such as when a device has a publicly accessible IP address. In some examples, the system may establish communication sessions using a combination of the STUN system and the TURN system without departing from the disclosure. For example, a communication session may be more easily established/configured using the TURN system, but may benefit from latency improvements using the STUN system. Thus, the first computer system 520 may route data using the STUN system, the TURN system, and/or a combination thereof without departing from the disclosure. In addition to routing data, the media routing components 630 also perform topology optimization. For example, the media routing components 630 may include geographically distributed media relay components (e.g., TURN/STUN servers) to enable the communication system 602 to efficiently route the data packets. For example, the media routing components 630 may include a control plane that coordinates between the media relay components to select an optimum route (e.g., data path) to send the data packets. To illustrate an example, the media routing components 630 may determine a location of parties in a communication session and determine a data path that bypasses a particular country or chokepoint in the data network. In some examples, the media routing components 630 may select an enterprise specific route and only use specific connected links associated with the enterprise.

Additionally or alternatively, the media routing components 630 may apply machine learning models to further reduce latency by selecting the optimum route using non-geographical parameters (e.g., availability of servers, time of day, previous history, etc.). While the description of the media relay components 634 refers to the STUN system and/or the TURN system, the disclosure is not limited thereto. Instead, the media routing components 630 may use any alternative systems known to one of skill in the art to route the data packets. For example, the media routing components 630 may use any technique that routes UDP data packets and allows the UDP data packets to traverse the NATs without departing from the disclosure. To illustrate an example, the media routing components 630 may include UDP packet forwarding and relay devices instead of the TURN system without departing from the disclosure.

The communication system 602 may include session signaling components 640 (e.g., edge signaling, signaling network, etc.) that may be configured to coordinate signal paths (e.g., routing of data packets) and/or a type of data packets sent between the devices and server(s) within the communication system 602. For example, the session signaling components 640 may enable the devices to coordinate with each other to determine how data packets are sent between the devices. In some examples, a signal path may correspond to a routing table that indicates a particular route or network addresses with which to route data between two devices, although the disclosure is not limited thereto. As illustrated in FIG. 6, the session signaling components 640 may support protocols including Session Initiation Protocol (SIP) 641, Real-Time Communication (RTC) protocol 642 (e.g., WebRTC protocol), voice interface system protocol (e.g., Alexa Voice Service (AVS) protocol 643 and/or other voice user interface protocols), Extensible Messaging and Presence Protocol (XMPP) 644, IP Multimedia Core Network Subsystem (IMS) 645, H.323 standard 646, and/or the like, although the disclosure is not limited thereto.

The communication system 602 may include gateway components 650 that enable the communication system 602 to interface with (e.g., send/receive media content or other data) external networks. As illustrated in FIG. 6, the gateway components 650 may include a public switched telephone network (PSTN) gateway 652, a mobile carrier gateways 654, a social networking gateway 656, an IP communication network gateway 658, and/or other gate-ways known to one of skill in the art. While FIG. 6 illustrates the gateway components 650 including a single gateway for each external network, this is intended for illustrative purposes only and the gateway components 650 may include multiple gateways for each external network without departing from the disclosure. For example, the gateway components 650 may include multiple PSTN gateways 652 having different locations without departing from the disclosure. Additionally or alternatively, a single type of external network may correspond to multiple external networks without departing from the disclosure. For example, the gateway components 650 may include a first mobile carrier gateway 654 corresponding to a first mobile carrier network and a second mobile carrier gateway 654 corresponding to a second mobile carrier network without departing from the disclosure. However, the disclosure is not limited thereto and two or more mobile carrier networks may share a mobile carrier gateway 654 without departing from the disclosure.

To illustrate an example of using the gateway components 650, the first computer system 520 may use the PSTN gateway 652 to establish a communication session with a PSTN device (e.g., wired/wireless telephone, cellular phone, and/or the like that is associated with a PSTN telephone number) using the PSTN. For example, the first computer system 520 may use the session signaling components 640 to send SIP data packets from a device to a PSTN gateway 652. The PSTN gateway 652 may receive the SIP data packets, convert the SIP data packets to audio data in a different format, and send the audio data to the PSTN device via the PSTN. Thus, the gateway components 650 may include a plurality of gateways, with each gateway being associated with a specific external network and configured to act as an interface between the communication system 602 and the external network.

Figure 7:
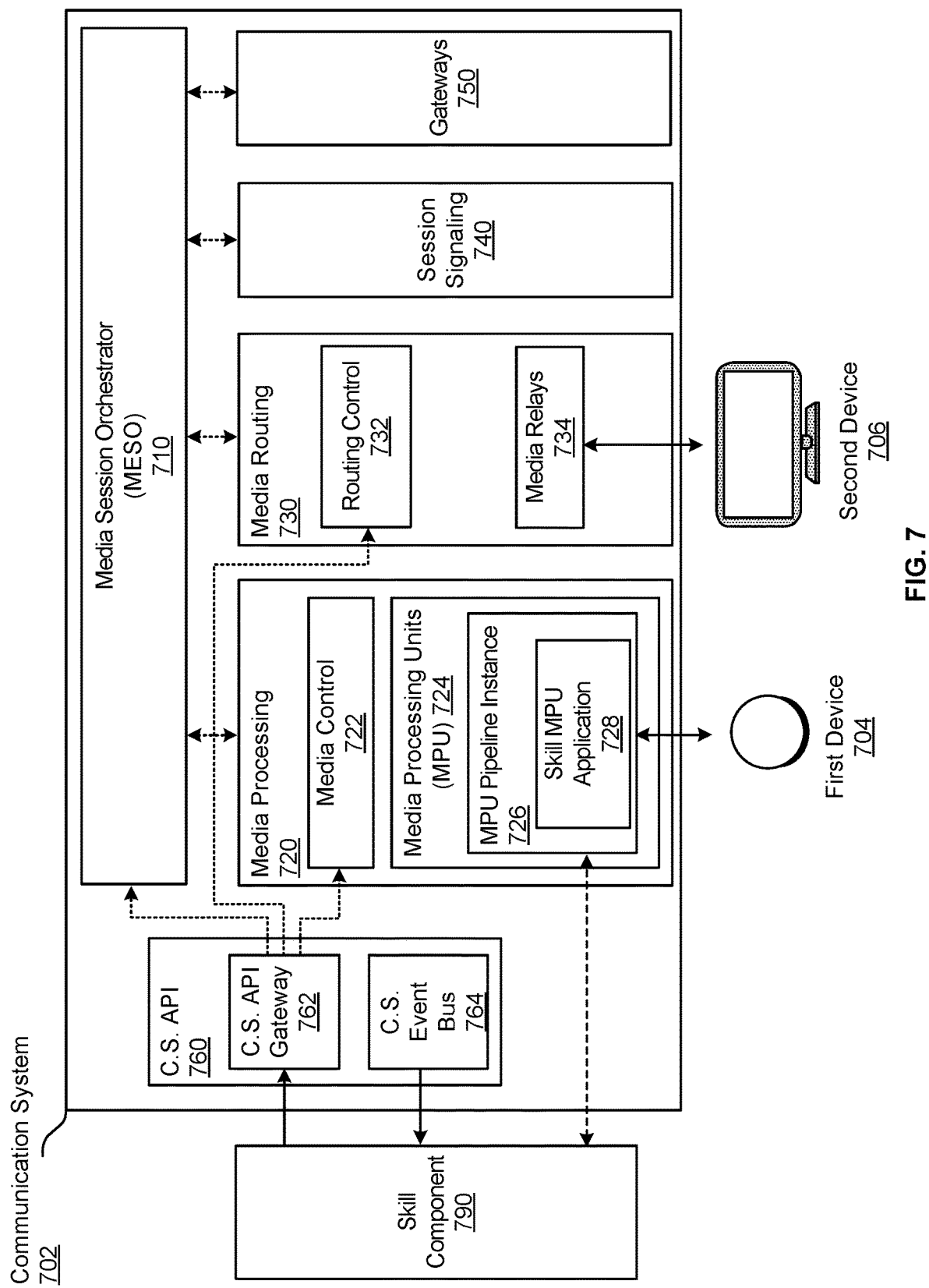
FIG. 7 illustrates an example of a data flow between components of a communication system, in accordance with embodiments of the present disclosure.

FIG. 7 illustrates an example of a data flow between components of a communication system 702, in accordance with embodiments of the present disclosure. The communication system 702 is an example of the communication system 602 of FIG. 6.

As illustrated in FIG. 7, the skill component 790 may send data to a communication system application programming interface (API) 760. The communication system API 760 may include a communication system API gateway component 762 that receives the data (e.g., request) and sends data to the MESO component 710, the media processing components 720, the media routing components 730, and/or other components. For example, FIG. 7 illustrates the communication system API gateway component 762 communicating with the MESO component 710, the media control component 722, and the routing control component 732.

As described above with regard to FIG. 6, the MESO component 710 may communicate with the media processing components 720, the media routing components 730, the session signaling components 740, and/or the gateway components 750. Internal signaling within communication system 702 is represented in FIG. 7 as dotted lines.

The components within communication system 702 may process the request received from the communication system API gateway 762 and send data to the communication system API 760 in response to processing the request. For example, components within communication system 702 may send data to a communication system event bus 764 of the communication system API 760 and the communication system event bus 764 may send data (e.g., event, notification, etc.) to the skill component 790. Data sent as part of the communication system interface between the skill component 790 and communication system 702 is represented in FIG. 7 using a solid line.

As illustrated in FIG. 7, the skill component 790 may communicate with the MPU 724. For example, the skill component 790 may communicate with an MPU pipeline instance 726 running within the MPU 724 that includes a skill MPU application 728. Thus, the skill component 790 may communicate directly with the skill MPU application as part of an application interface, which is represented as a dashed line in FIG. 7. In addition to communicating with the skill component 790, the MPU pipeline instance 726 may send data (e.g., media content) to a device 704 (e.g., the first device 210 of FIG. 2) and a device 706 (e.g., the second device 240 of FIG. 2), either directly or via the media relay components 734.

As used herein, an MPU pipeline instance or any other instance may refer to a specific component that is executing program code; all of the logic associated with the media processing unit is running in memory in a single host, which decreases latency associated with the media processing. For example, conventional techniques for executing asynchronous workflows perform checkpointing to store data in storage components between events. Thus, when a new event occurs, the conventional techniques retrieve the stored session and loads data into the memory, resulting in a large amount of latency. As part of reducing the latency, communication system 602 may use the MESO component 710 to route triggers and events directly to the MPU pipeline instance that is performing the media processing, enabling communication system 702 to perform media processing in real-time.

Using the MESO component 710, communication system 702 allows skills and/or applications to enable unique functionality without requiring the skill/application to independently develop and/or program the functionality. Thus, communication system 702 may offer media processing operations as a service to existing skills/applications. For example, communication system 702 may enable a skill to provide closed captioning or other features without building a closed captioning service. Instead, communication system 702 may route a communication session through an MPU 724 configured to perform closed captioning. Thus, an MPU 724 configured to enable a specific feature may be utilized to enable the feature on multiple skills without departing from the disclosure.

As the MESO component 710 is capable of executing requests and commands with low latency, the communication system 702 may utilize multiple components within a single communication session. For example, the communication system 702 may combine multiple different components (e.g., MPUs 724 associated with one or more skills) to piece together a custom implementation enabling a combination of existing features. To illustrate an example, communication system 702 may build back-to-back SIP user engine that is customizable for a specific implementation. Thus, the MESO component 710 may mix and match different components and/or features to provide a customized experience.

Figure 8:
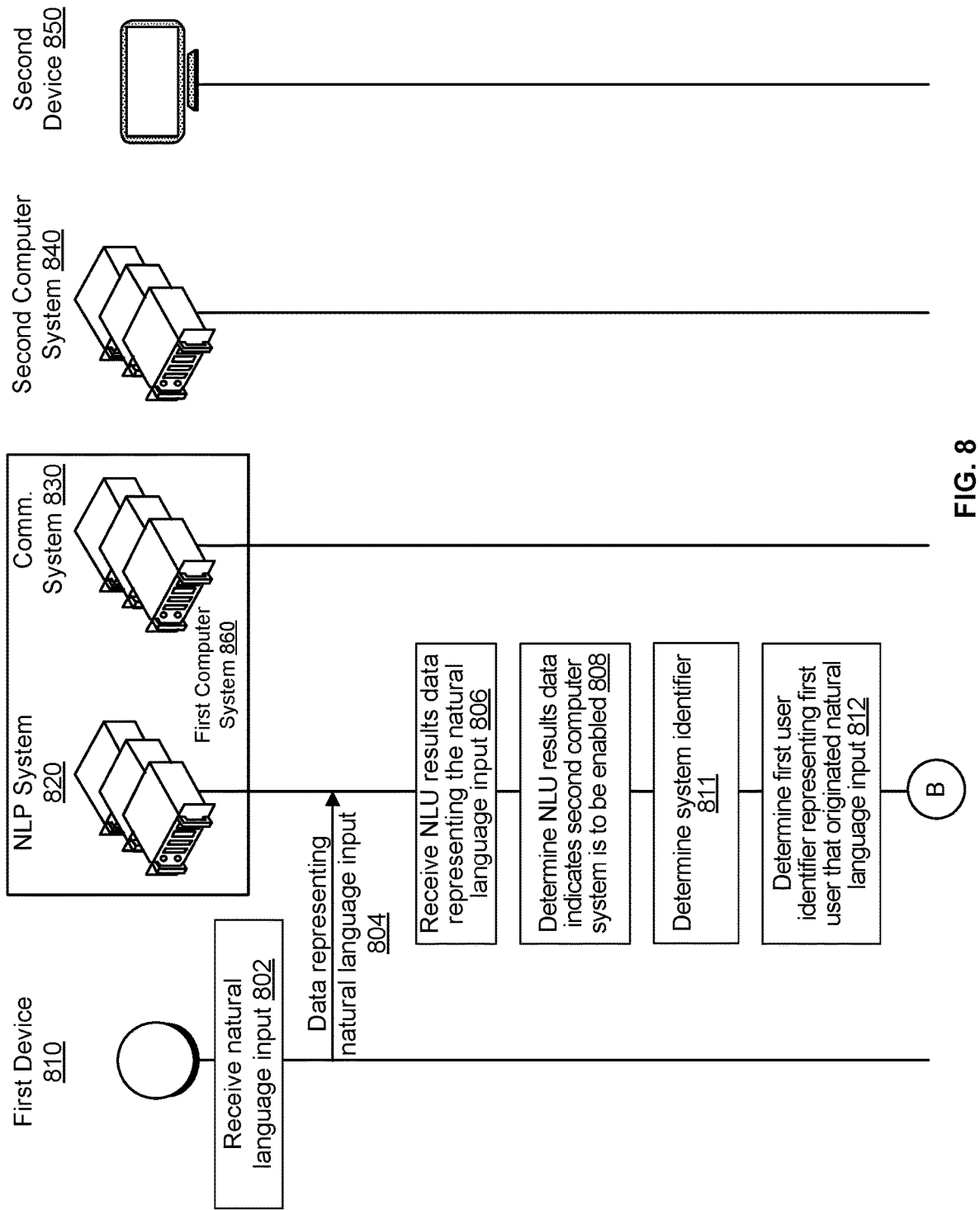
FIG. 8 illustrates an example of a diagram usable for determining a second computer system, in accordance with embodiments of the present disclosure.

FIG. 8 illustrates an example of a diagram usable for determining a second computer system, in accordance with embodiments of the present disclosure. Operations of the diagram are illustrated in connection with a first device 810 operable by a first user (e.g., an example of the first device 210 of FIG. 2), a NLP system 820 (e.g., an example of the NLP system 522 of FIG. 5), a communication system 830 (e.g., an example of the communication system 534 of FIG. 5), a second computer system 840 (e.g., an example of the second computer system 530), and a second device 850 operable by a second user (e.g., the second device 240 of FIG. 2). The NLP system 820 and the communication system 830 can be components of a first computer system 860 (e.g., the first computer system 520) with which a first user of the first device 810 has a first account (e.g., an NLP user account). The second computer system 840 may also but need not be a component of the first computer system. The first user may have a first account with the first computer system (referred to herein as a "NLP user account" in the interest of clarity). For an action to be executed by the second computer system 840 for the first user, a second account of the first user with the second computer system 840 may be needed. In the interest of clarity, this second account is referred to herein as a "system user account." Further, the second user of the second device 850 has a third account (e.g., yet another system user account) with the second computer system 840. These components and additional operations thereof are further described in FIGS. 9-12. Although the figures and discussion illustrate certain operations in a particular order, the operations described may be performed in a different order (as well as certain operations removed or added) without departing from the intent of the disclosure. Further, the operations may be equivalently used for a skill component that may be a part of the first computer system or distributed between the first computer system and the second computer system.

As illustrated, the first device 810 may receive (802) a natural language input. The first device 810 may receive the natural language input as audio corresponding to a spoken natural language input. Alternatively, the first device 810 may receive the natural language input as text corresponding to a typed natural language input.

The first device 810 may send (804) to the NLP system 820 (e.g., to an orchestrator component thereof) data representing the natural language input. For example, if the first device 810 receives the natural language input as audio, the data may be audio data. For further example, if the first device 810 receives the natural language input as text, the data may be text data.

The NLP system 820 may receive (806) NLU results data representing the natural language input. For example, if the orchestrator component receives audio data, the orchestrator component may send the audio data to an ASR component. The ASR component may generate text data representing the audio data and may send the text data to the orchestrator component. The orchestrator component may send the text data to an NLU component. The NLU component may generate NLU results data representing the text data and may send the NLU results data to the orchestrator component. For further example, if the orchestrator component receives text data, the orchestrator component may send the text data to the NLU component. The NLU component may generate NLU results data representing the text data and may send the NLU results data to the orchestrator component. In another example, if the orchestrator component receives audio data, the orchestrator component may send the audio data to an SLU component. The SLU component may generate NLU results data representing the natural language input in the audio data and may send the NLU results data to the orchestrator component.

The NLP system 820 (e.g., the orchestrator component) may determine (808) the NLU results data indicate that interactions with the second computer system 840 are to be enabled. For example, such determination may be based on the NLU results data including an <Enable> intent and a tagged portion of text corresponding to a system name and/or to a set of actions that the second computer system 840 supports. Further, the NLP system 820 (e.g., the orchestrator component) may determine (811) an identifier of the second computer system 840 that is to be enabled. For instance, the orchestrator component may query system manifests by using the system name and/or the requested action(s) and identifies the second computer system 840 as the proper target.

The NLP system 820 (e.g., the orchestrator component) may determine (812) a first user identifier representing the first user that originated the natural language input. For example, the orchestrator component may receive the first user identifier from a user recognition component. The first user identifier can be determined based on any or a combination of speech characteristics in the received data that represents the natural language input, biometric data received from the first device based on a different input, image data received from the first device, user gesture data received from the first device, and the like. In examples where the orchestrator component receives multiple user identifiers, associated with respective scores, from the user recognition component, the orchestrator component may determine the first user identifier associated with the greatest score.

Figure 9:
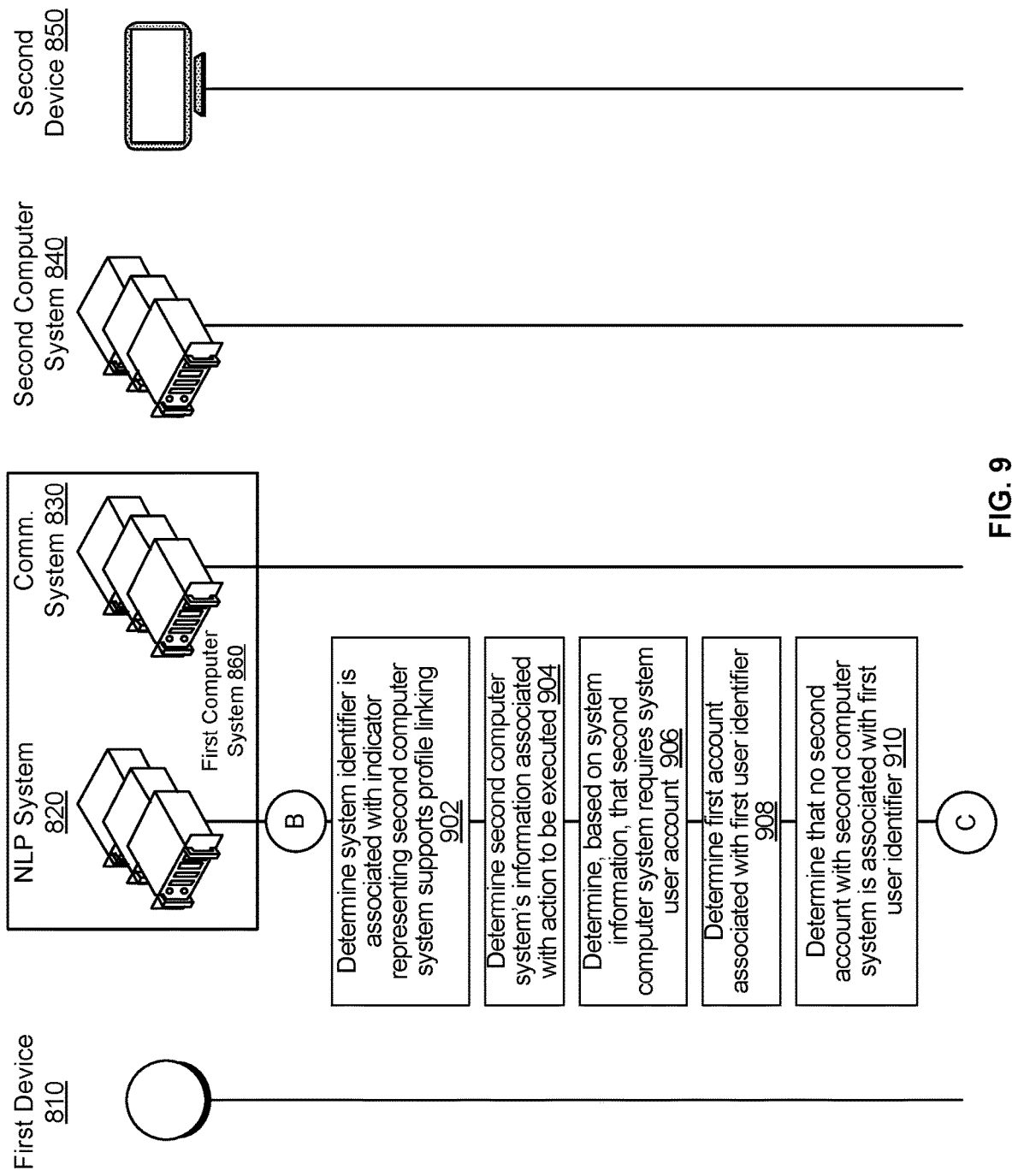
FIG. 9 illustrates an example of a diagram usable for determining that an account is to be generated, in accordance with embodiments of the present disclosure.

FIG. 9 illustrates an example of a diagram usable for determining that the second account of the first user (e.g., the system user account) is to be generated, in accordance with embodiments of the present disclosure. The operations of the diagram follow operation 812.

The NLP system 820 (e.g., an account linking component) may determine (902) the system identifier is associated with an indicator representing the second computer system 840 supports account linking. As described above, a developer may provide the NLP system 820 with data representing one or more runtime functionalities require a system user account. When approving the second computer system 840 for runtime processing of natural language inputs, the NLP system 820 may generate a system manifest for the second computer system 840. As used herein, a "system manifest" may refer to stored associations between a system identifier (of the second computer system 840) and data provided by a developer with respect to the second computer system 840. In at least some examples, determining that the system identifier is associated with the indicator may include the account linking component querying a system manifest storage for an indicator, representing a second computer system 840 supports account linking, associated with the system identifier. The account linking component may have received the system identifier (as well as the first user identifier) from the orchestrator. In response, the account linking component may receive query results representing the system identifier is associated with the indicator in the system manifest storage. In at least some other examples, the account linking component may determine the second computer system 840 supports account linking based on NLP user accounts, of other users of the NLP system 820, including the system identifier associated with one or more system user account tokens (representing other users of the NLP system 820 have system user accounts stored by the second computer system 840 and linked to the users' NLP system 820 stored NLP user accounts).

The NLP system 820 (e.g., the account linking component) may determine (904) second computer system's information associated with the action to be executed. For instance, the system manifest of the second computer system 820 is queried using an identifier of the action and the query results may include information indicating that the action is supported and that its execution may necessitate a system user account with the second computer system.

The NLP system 820 (e.g., the account linking component) may determine (906) that the second computer system 840 requires a system user account to perform the requested action. For example, the query results can also indicate that the system user account is required.

To determine whether the first user has the required system user account with the second computer system 840, the NLP system 820 (e.g., the account linking component) may determine (908) the first account of the first user with the NLP system 820 (e.g., their NLP user account). For example, the account linking component can query an NLP account storage by using the first user identifier. The query results may include account data of the first account including, for instance, a first identifier of the first account.

In the illustrative example of FIG. 9, the NLP system 820 (e.g., the account linking component) may determine (910) that no second account with the second computer system 840 is associated with the first user identifier (and, thus, the first user does not have a system user account with the second computer system 840 and such an account is to be generated). Different techniques exist to make this determination. In an example, the account data included in the query results of the NLP account storage can exclude a second token of the second computer system 840 (e.g., a "no token result" is included in the query results from the NLP account storage). In another example, the account linking component may query the second computer system 840 by using the first user identifier to determine whether the system user account has been generated and may receive back a "no results" query result. In yet another example, the NLU results data can indicate an intent to generate the system user account.

In response to receiving such query results, the account linking component may send, to the orchestrator component, data asking the user for a confirmation of whether the user has a system user account stored by the second computer system 840. The orchestrator component may send to the first device 810 data querying the user whether the user has a system user account stored by the second computer system 840. The data sent by the orchestrator component to the first device 810 may be the data the orchestrator component received from the account linking component or may be a representation of the data received from the account linking component. For example, a representation may be TTS component output audio data (e.g., synthesized speech) representing text data the orchestrator component received from the account linking component.

The first device 810 may output the data querying the user whether the user has a system user account stored by the second computer system 840. In response, the first device 810 may receive a user input and send, to the orchestrator component, data representing the user input. In at least some examples, the user input may be a spoken natural language input, in which examples the data sent to the orchestrator component may be audio data. In at least some examples, the user input may be a typed natural language input, in which examples the data sent to the orchestrator component may be text data. In at least some examples, the user input may be the selection of a button presented on a display of the first device 810, in which examples the data sent to the orchestrator component may be text data representing the selected button. In at least some examples, the user input may be a gesture (e.g., the user shaking their head yes or no), in which examples the data sent to the orchestrator component may be video data corresponding to images consecutively captured by a camera associated with the first device 810.

The orchestrator component may confirm the user input represents the user does not have a system user account stored by the second computer system 840. Such determination may depend on the data the orchestrator received from the first device 810. For example, if the orchestrator component receives audio data, the orchestrator component may send the audio data to the ASR component. The ASR component may generate text data representing the audio data and may send the text data to the orchestrator component. The orchestrator component may send the text data to the NLU component. The NLU component may generate NLU results data representing the text data and may send the NLU results data to the orchestrator component. For further example, if the orchestrator component receives text data, the orchestrator component may send the text data to the NLU component. The NLU component may generate NLU results data representing the text data and may send the NLU results data to the orchestrator component. In another example, if the orchestrator component receives audio data, the orchestrator component may send the audio data to an SLU component. The SLU component may generate NLU results data representing the natural language input in the audio data and may send the NLU results data to the orchestrator component. The orchestrator component, in the foregoing examples, may determine the NLU results data represents the user does not have a system user account stored by the second computer system 840. In another example, if the orchestrator component receives video data, the orchestrator component (or another component of the NLP system 820) may perform machine vision processing to determine the gesture, and determine the gesture corresponds to a user input representing the user does not have a system user account stored by the second computer system 840. After the orchestrator component determines the user input represents the user does not have a system user account stored by the second computer system 840, the orchestrator component may send to the account linking component data representing the user does not have a system user account stored by the second computer system 840.

Figure 10:
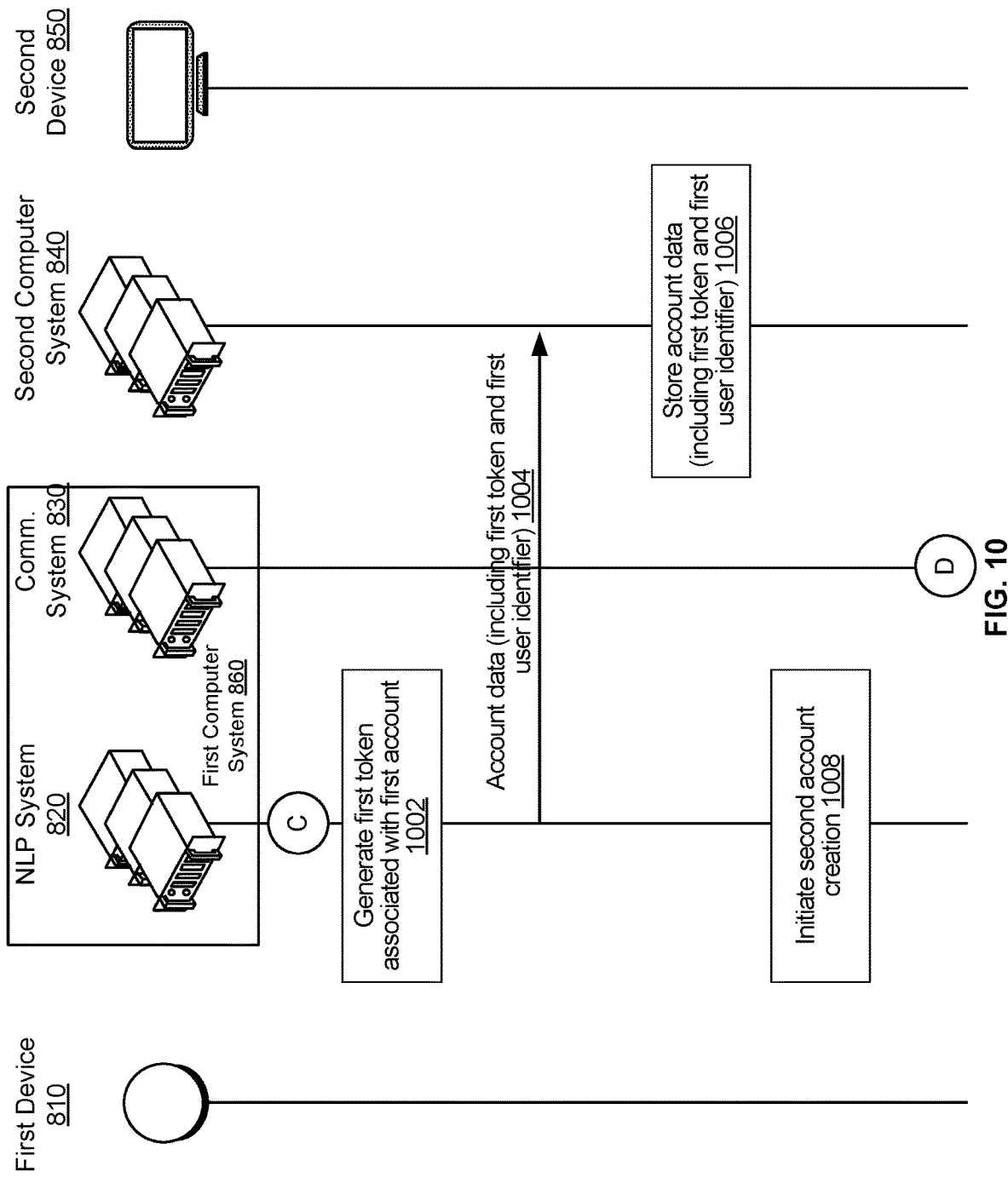
FIG. 10 illustrates an example of a diagram usable for providing data associated with a first account, in accordance with embodiments of the present disclosure.

FIG. 10 illustrates an example of a diagram usable for providing data associated with the first account (e.g., the NLP user account) to the second computer system 840, in accordance with embodiments of the present disclosure. The operations of the diagram follow operation 910.

As illustrated, the NLP system 820 (e.g., the account linking component or another component of the NLP system 820 or the first computer system configured as an OAuth authorization endpoint) may generate (1002) a first token associated with the first account (e.g., the NLP user account of the first user). For example, the NLP system 820 performs an OAuth 2.0 process that may involve an endpoint of the second computer system 840 to generate the first token. Additionally, the NLP system 820 (e.g., the orchestrator component, the ASR component, the NLU component, and the TTS component) may request user input to define a scope of the first token and a user setting for using the first token.

The NLP system 820 (e.g., the account linking component) may send (1004) account data to the second computer system 840. The account data can include the first token (or, if this token was provided based on the OAuth 2.0 process, it may not need to be included in the account data). The account data can also include the first user identifier such. Other types of account data can also be sent subject to user permissions. For instance, the username, address, and the like, if permitted, can be sent to the second computer system 840.

In turn, the second computer system 840 stores (1006) the account data. For instance, the first token, the first user identifier, and any other received account data can be stored in a data store according to a data structure (e.g., the data structure 420 of FIG. 4).

The NLP system 820 (e.g., the orchestrator) may initiate (1008) the creation of the second account (e.g., the system user account to be linked with the NLP user account). Different techniques are available to generate the second account, as further described in FIG. 11. The initiation can depend on these techniques. For instance, for an outbound communication technique, the NLP system 820 can request the communication system to establish a communication session between the first device 810 and an endpoint of the second computer system 840 (e.g., an endpoint configured as a call center). For a system manifest technique, the NLP system 820 can perform a query to determine the types of account data needed for the second account and the specific account data that is already available from the first account (e.g., the NLP user account).

Figure 11:
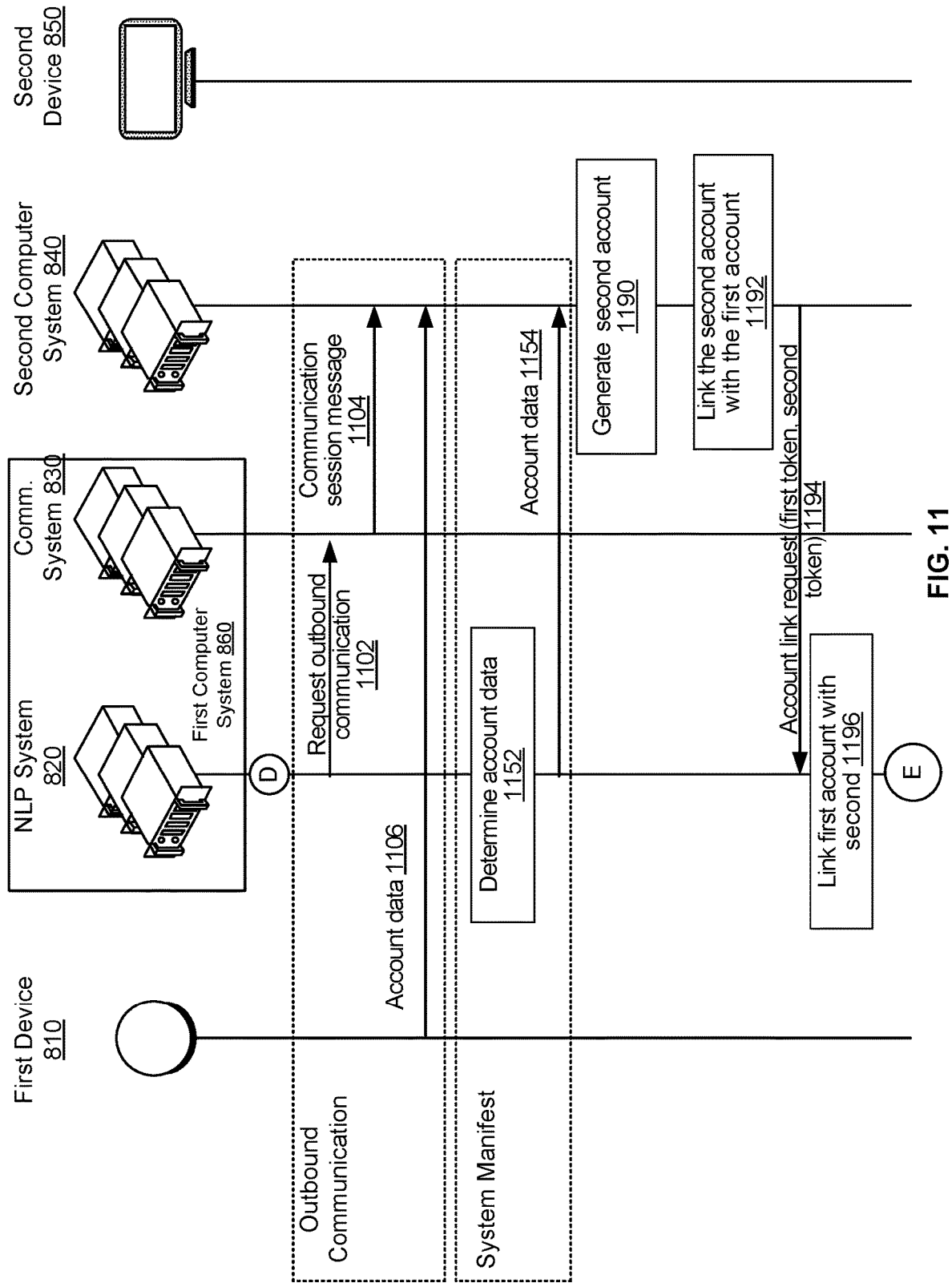
FIG. 11 illustrates an example of a diagram usable for generating a second account and associating two accounts, in accordance with embodiments of the present disclosure.

FIG. 11 illustrates an example of a diagram usable for generating the second account and associating two accounts, in accordance with embodiments of the present disclosure. The operations of the diagram follow operation 1008. As indicated at operation 1008, different techniques are possible to determine account data needed for the second account. FIG. 11 illustrates two techniques by using two dotted rectangles, each corresponding to a technique. The first technique is referred to as an outbound communication technique. Briefly, this technique enables, for instance, connecting the first user to a call center of the second computer system 840 such that the first user can provide the needed account data. The second technique is referred to as a system manifest technique. Briefly, this technique automates the account data collection processing by having a priori knowledge of the type of account data that the second system needs and fetching this data from the first account or requesting the first user to provide it. Of course, both techniques can be used in combination.

As illustrated, the outbound communication technique involves the NLP system 820 requesting (1102) the communication system 830 to establish a communication session between the first device 810 and an endpoint of the second computer system 840 (e.g., an endpoint configured as a call center). For instance, the orchestrator component can send to the communication system 830 the first user identifier, the system identifier of second computer 840, the first token, and/or an indication that an outbound communication is requested.

The outbound communication technique also involves the communication system 830 sending (1104) a communication session message to the second computer system 840. This message can be, for instance, a SIP invitation that includes the first user identifier as a source and an identifier of the component as a destination. The SIP invitation may additionally or alternatively include the first token such that the second computer system 840 can determine the first user identifier (if not included) from stored account data (per operation 1006) or, if included, validate this identifier against the stored identifier. A SIP message may also be sent to the first device 810. Upon a response from the endpoint and, as applicable, from the first device 810, the communication system 830 establishes the communication session therebetween.

The outbound communication technique also involves the first device 810 sending (1106) the relevant account data to the endpoint. For instance, audio, video, and/or other content is presented by the first device 810 to the first user based on instructions from the endpoint, where these instructions request the relevant account data. In response, user input is received at the device, whereby the first device sends this input as the account data to the endpoint.

As illustrated, the system manifest technique involves the NLP system 820 determining (1152) the account data. For example, the orchestrator can determine, based on the system manifest, data needed by the second computer system 840 to generate the second account. If this data is available from the NLP user account of the first user and its sharing is permitted, the orchestrator can include this data in the account data. If the permission is unknown or not already defined, the orchestrator component can request the user permission to be received via the first device 810 (e.g., by invoking the TTS component and, as needed, the ASR component and the NLU component). If some of the needed data is not already available from the account data of the NLP user account, the orchestrator component can request such data and the related user permission to be input the user via the first device 810 (e.g., by invoking the TTS component and, as needed, the ASR component and the NLU component).

The system manifest technique also involves the NLP system 820 sending (1154) the account data to the second computer system 840. For instance, the account data is sent in a request to generate the second account.

Regardless of which technique is used to determine the account data, the second computer system 840 receives generates (1190) the second account (e.g., the system user account of the first user) using the received account data. For instance, the received account data is stored in a set of files having access controls, representing the second account, and associated with a second user identifier.

The second computer system 840 links (1192) the second account with the first account. For instance, the second computer system 840 stores the first user identifier and the first token in the in the second account such that the first user identifier and the first token become associated with the second user identifier. A data structure, similar to the data structure 420, can be used to store such associations.

The second computer system 840 also sends (1194) an account link request to NLP system 820. The link request can include the second user identifier. The link request can also include the first token such that the NLP system 820 can receive and compare this token to the one that was generated and stored for the first user account (per operation 1002). If a match is found, the NLP system 820 can determine that the link request is valid to then proceed with the linking. Otherwise, the NLP system 820 can determine that the link request is invalid and may not proceed with the linking (or may request a user permission to do so via the first device 810). The link request can also include a second token of the second account (which may be sent separately and subsequently to sending the first token; in other words, the link request can include multiple portions, such as a first portion that includes the first token and a second portion that includes the second token). This second token can be generated by the second computer system 840 (or by an endpoint configured to do so on behalf of the second computer system) according to an OAuth process. If OAuth 2.0 with an authorization grant code process is followed, the first portion of the link request can include an authorization code, as well as the first token, and is sent to an endpoint of the NLP system 820. Upon validation, the NLP system endpoint responds with a request for reciprocal token, where this request also includes the authorization code. The second computer system 840 then sends the second token as the reciprocal token, where this response back to the NLP system 820 represents the second portion of the link request.

The NLP system 820 links (1196) the first account with the second account. For instance, the NLP system 820 stores the second user identifier (if provided), the second token, and the system identifier of the second computer system 840 in the in the first account. A data structure, similar to the data structure 410, can be used. In addition, input of the first user can be received by the NLP system 820 from the first device 810 during the account generation and/or subsequently by the NLP system 820 and/or the second computer system 840 to define a use setting associated with using the second token. The user setting can be included in the first account.

Figure 12:
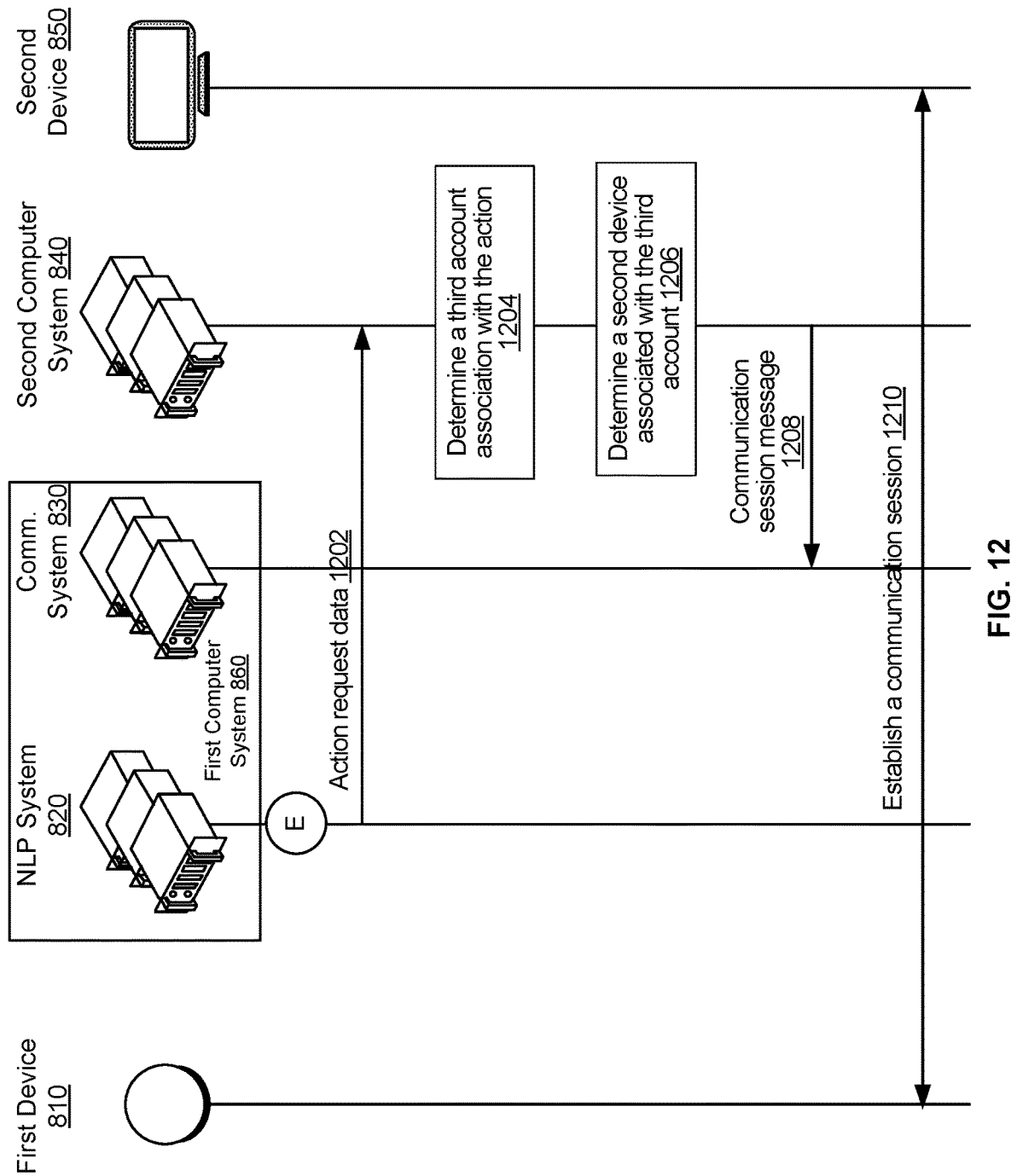
FIG. 12 illustrates an example of a diagram usable for establishing a communication session, in accordance with embodiments of the present disclosure.

FIG. 12 illustrates an example of a diagram usable for establishing a communication session between the first device 810 and the second device 850, in accordance with embodiments of the present disclosure. The operations of the diagram follow operation 1196 and assume that the action that was requested involves establishing the communication session.

The NLP system 820 sends (1202) action request data to the second computer system 840. Based on the NLU processing, the action request data can indicate that a communication session is to be established. The action request data can also include various parameters associated with the action. For instance, the action request data can include the first user identifier and/or the second user identifier, thereby allowing the second computer system 840 to determine the second account. Additionally or alternatively, the action request data can include the first token, thereby allowing the second computer system 840 to determine the second account based on the linking data that includes the first token and to determine that access to second account and/or another component in association with the action (e.g., for the purpose of establishing the communication session) is authorized.

The second computer system 840 determines (1204) a third account associated with the action (e.g., another system user account). For instance, the second computer system 840 may store an action-account manifest indicating, per action, system user accounts that supports the action and, optionally, a support capability (e.g., a status, timing, knowledge level, experience level, specialty, etc.) of each of such accounts. Given parameters of the action (e.g., type, timing, user preferences), the second computer system 840 can query the action-account manifest and receive a query result that includes a third user identifier of the third account.

The second computer system 840 determines (1206) that the second device 850 is associated with the third account. For instance, the third account may store identifiers of devices and support capabilities (e.g., status, audio capability, video capability, locations, etc.). Given parameters of the action (e.g., a video call within a certain geographic area), the computer system 840 may identify the second device 850.

The second computer system 840 sends (1208) a communication session message to the communication system 830. For instance, a SIP invitation is sent and includes the first user identifier (e.g., as determined from the account liking data) as a destination and a third user identifier (as determined from the third account) as a source. The SIP invitation can also include the first token (e.g., as determined from the account liking data), thereby allowing the communication system 830 to determine the first account based on the linking data that includes the first token and to determine that access to first account and/or a component of the communication system 830 in association with the action (e.g., for the purpose of establishing the communication session) is authorized.

The communication system 830 sending (1210) the communication session between the first device 810 and the second device 850. For instance, the communication system 830 determines the first device 810 based on the first account (and, option, presence data as described herein above) and sends a SIP message to this device 810. Based on a response, the communication system 830 determines a route and completes other communication tasks, as described in FIG. 7, to establish the communication session.

As described herein above, other types of actions are possible and may not involve a communication session between these two devices. Modifications to the above flow are possible to support such actions. For example, rather than receiving an inbound communication request from the second computer system 840, an outbounds communication request can be made thereto. In this case, the NLP system 820 can access the second computer system 840 based on the second token, determine the third user account and the third user identifier, and pass this data to the communication system 830 that then initiates the communication session.

Some of the actions may not involve a communication session. For instance, an action can be to schedule an appointment. In this illustration, the NLP system 820 can access the computer system (e.g., an appointment scheduling skill or application thereof) based on the second token and schedule the appointment on behalf of the first user.

Figure 13:
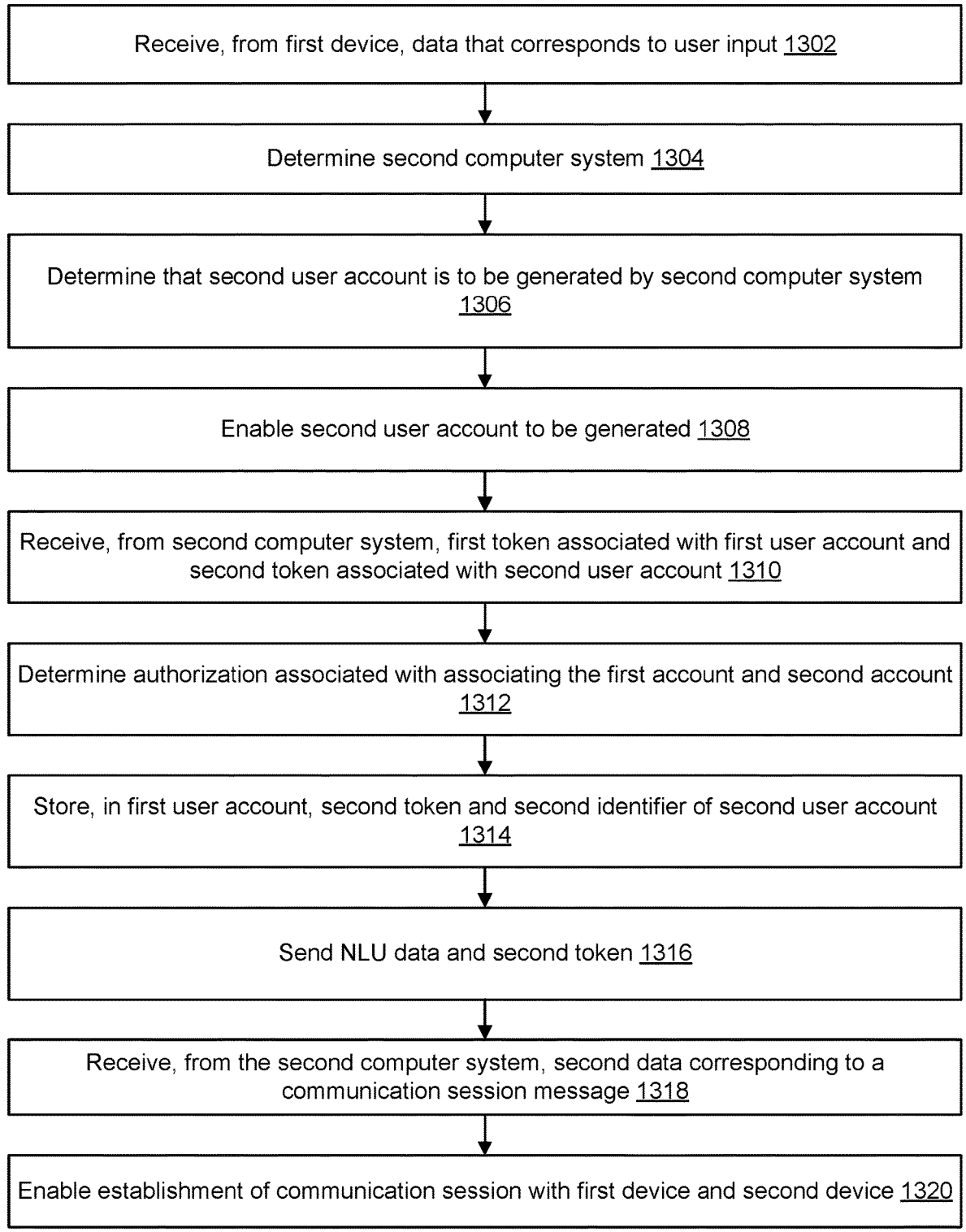
FIG. 13 illustrates an example of a flow for generating and associating accounts in support of device communication sessions, in accordance with embodiments of the present disclosure.

FIG. 13 illustrates an example of a flow for generating and associating accounts in support of device communication sessions, in accordance with embodiments of the present disclosure. Operations of the flow can be performed by a first computer system, such as the first computer system 220 of FIG. 2. Some or all of the instructions for performing the operations can be implemented as hardware circuitry and/or stored as computer-readable instructions on a non-transitory computer-readable medium of the first computer system. As implemented, the instructions represent components that include circuitry or code executable by processor(s) of the first computer system. The use of such instructions configures the first computer system to perform the specific operations described herein. Each circuitry or code in combination with the relevant processor(s) represents a means for performing a respective operation(s). While the operations are illustrated in a particular order, it should be understood that no particular order is necessary and that one or more operations may be omitted, skipped, performed in parallel, and/or reordered.

The flow may start at operation 1302, where the first computer system receives, from a first device (e.g., the first device 210 of FIG. 2), data that corresponds to a user input. In an example, the device is operated by the user, where the user is associated with a first user account stored by the first computer system. The user input can be a spoken natural language input that requests communications with a telehealth provider (or some other action). In this case, the data is audio received that is generated by the first device and that represents the spoken natural language input. As explained herein above, the audio data is one type of input data and other types of input data can be received additionally or alternatively, such as text data. In the case of text data, the user input can be text input at the device (e.g., as part of a text chat with a chatbot). The first computer system performs speech processing on the data to generate NLU data that represents the spoken natural language input. In case of receiving audio data, ASR and NLU processing can be applied thereto. In the case of receiving text data, NLU processing can be applied thereto. Other types of data processing are also or alternatively possible based on the type of the received input data.

At operation 1304, the first computer system determines a second computer system (e.g., the second computer system 230 of FIG. 2) configured to execute a telehealth action associated with the NLU data. For example, this determination includes a query to a system manifest describing actions that the second computer system supports or includes matching a portion of the NLU data with a system name of the second computer system. The second computer system can store a third user account that supports the telehealth action, where the third user account corresponds to a second user and is associated with a second device that the second user can operate (e.g. the second device 240 of FIG. 2).

At operation 1306, the first computer system determines that a second user account is to be generated for the user by the second computer system. For instance, a query is performed requesting whether a second token of the second user account is available from the first account and the query result indicates that no such token exists. Additionally or alternatively, a query is made to the second computer system returning a result indicating that the second user account does not exist, where the query includes a first identifier of the first user account. Additionally or alternatively, a the NLU data indicates a request to generate the second user account.

At operation 1308, the first computer system enables the second account to be generated. For example, the first computer system causes the second computer system to generate the second user account by at least sending first data to the second computer system. The first data includes the first identifier of the first user account and a first token associated with the first user account. For instance, the first data is sent in response to determining that the second account is generated. The first token can be generated by executing an an authorization code grant type OAuth process resulting in the first token being sent to the second computer system.

At operation 1310, the first computer system receives, from the second computer system, the first token and a second token associated with the second user account. For example, the first token is received in an account link request. Upon determining that the first token is associated with the first user account, the first computer system can send a request for a reciprocal token to the second computer system and receive the second token in a response to this request.

At operation 1316, the first computer system determines an authorization to associate the first account and the second account. In an example, this authorization is determined in response to the account link request and uses the first token to determine that the linking of the two accounts is permitted. For instance, the first access token includes first authorization data to access the first account on behalf of the user. By verifying the authorization data (e.g., by matching it with authorization data that includes that is stored by the first computer system and that indicates a permitted access scope), the first computer system can determine that the account link request represents an authorized access to the first account such that the second access token can be stored therein.

At operation 1314, the first computer system stores, in the first user account based at least in part on the first token, the second token and a second identifier of the second user account. The data structure 410 of FIG. 4 can store this information, in addition to other information, such as an identifier for the second computer system and a user setting associated with usage of the first token.

At operation 1316, the first computer system sends, to the second computer system, the NLU data and the second token. The NLU data can indicate a request for communications (e.g., a call with a telehealth provider is requested). The NLU data is an example of action request data. Of course, depending on the type of action and input data, different parameters can be sent in action request data to the second computer system to indicate the action, along with sending the second token.

At operation 1318, the first computer system receives, from the second computer system based at least in part on the NLU data and the second token, second data associated with the second device of the telehealth provider. The second data corresponds to a communication session invitation and comprises the first token and a third identifier of the third user account. For example, the second data is received in response to the NLU data indicating the request for communications in response to the second computer system using the second token and can identify the third user account as the source, the first identifier as the destination.

At operation 1320, the first computer system enables establishment of a communication session with the first device and the second device. For example, a communication system of the first computer system establishes the communication by using the first token to determine the first account and by sending communication session messages (e.g., SIP messages) to the first device and the second device.

Figure 14:
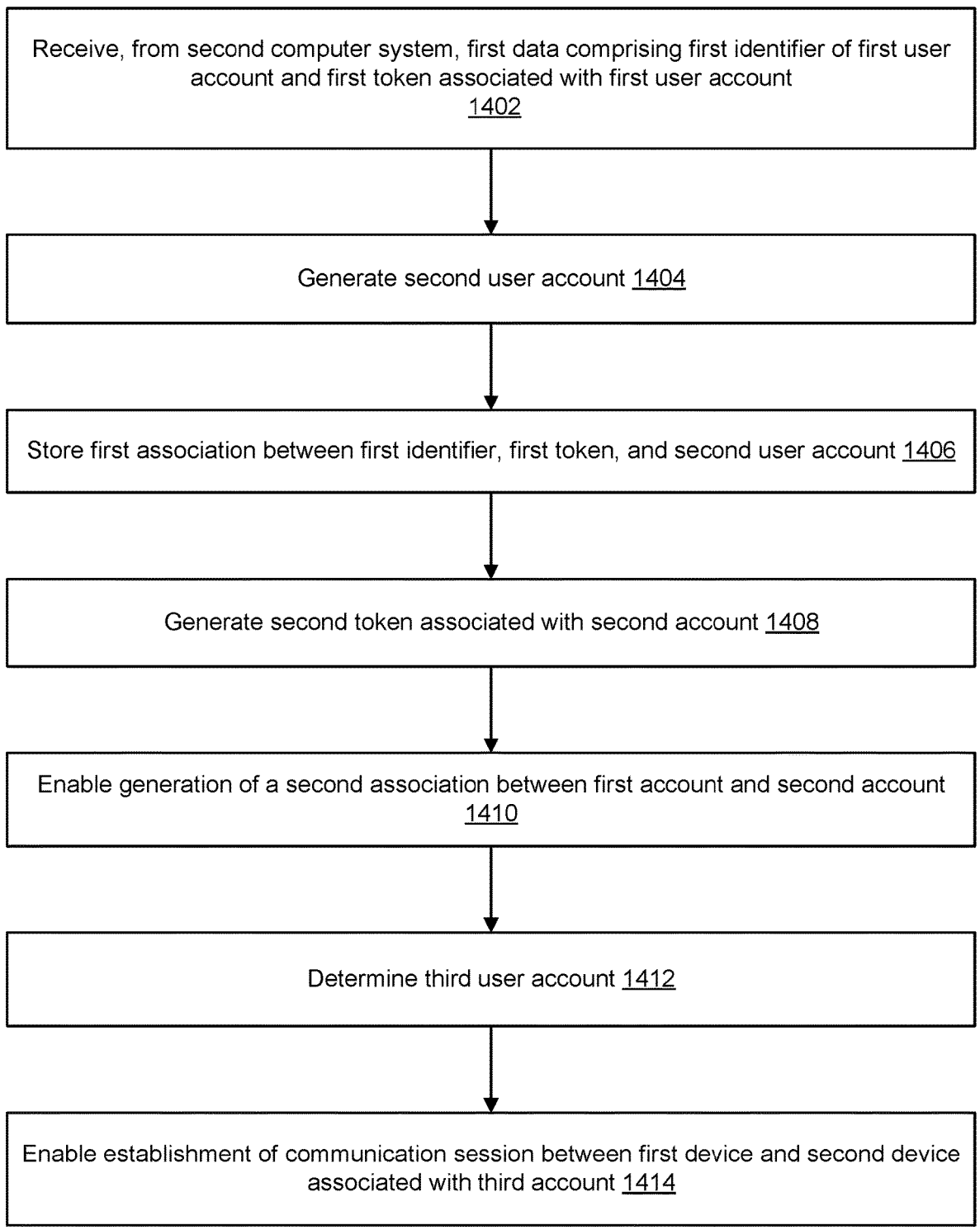
FIG. 14 illustrates another example of a flow for generating and associating accounts in support of device communication sessions, in accordance with embodiments of the present disclosure.

FIG. 14 illustrates another example of a flow for generating and associating accounts in support of device communication sessions, in accordance with embodiments of the present disclosure. Operations of the flow can be performed by a first computer system, such as the second computer system 230 of FIG. 2. Some or all of the instructions for performing the operations can be implemented as hardware circuitry and/or stored as computer-readable instructions on a non-transitory computer-readable medium of the first computer system. As implemented, the instructions represent components that include circuitry or code executable by processor(s) of the first computer system. The use of such instructions configures the first computer system to perform the specific operations described herein. Each circuitry or code in combination with the relevant processor(s) represents a means for performing a respective operation(s). While the operations are illustrated in a particular order, it should be understood that no particular order is necessary and that one or more operations may be omitted, skipped, performed in parallel, and/or reordered.

The flow may start at operation 1402, where the first computer system receives, from a second computer system (e.g., the first computer system 220 of FIG. 2), first data comprising a first identifier of a first account of a user and a first token associated with the first user account. The first data is received based at least in part on a spoken natural language input at a first device (e.g., the first device 210 of FIG. 2) communicatively coupled with the second computer system. The spoken natural language input requests communications with a telehealth provider. The first user account is stored by the second computer system. Other types of input data are possible. Likewise, other types of actions can be requested via the first device.

At operation 1404, the first computer system generates a second user account for the user based at least in part on the first data. For example, the first computer system configures a collection of resources (e.g., files) that may be access-controlled and that store various user identifying information. The second user account can be identified by means of a unique second identifier.

At operation 1406, the first computer system stores a first association between the first identifier, the first token, and the second user account. For example, the first token is stored in the user account, along with the first identifier of the first user account. A data structure, such as the data structure 420 of FIG. 4, can be used. In addition, user settings related to the use of the first token can also be stored.

At operation 1408, the first computer system generates a second token associated with the second user account. In an example, an OAuth 2.0 process can be executed to generate the second token. Along with the execution of the OAuth 2.0 process, the first computer system can send the first token, as well as an authorization code, to the second computer system. Based on the first token, the first computer system may receive the authorization code in a request for a reciprocal token from the second computer system. In turn, the first computer system can send the second token.

At operation 1410, the first computer system enables the generation of a second association between the first account and the second account to be established. For example, the first computer system causes the second computer system to generate the second association between the first identifier and a second identifier of the second user account by at least sending the first token and the second token to the second computer system. For instance, a link account request is sent, whereby as part of executing the OAuth 2.0 process, the link account request is used to send the first token and the authorization code.

At operation 1412, the first computer system determines, based at least in part on the first data, a third user account associated with the telehealth provider. For example, the first data can indicate parameters of the action by including NLU data resulting from the processing of input data corresponding to the spoken natural language input at the first device. The parameters can indicate that the communications with a telehealth provider are requested. The first computer system can determine that the third use account is associated with a telehealth provider and with a capability of providing communications.

At operation 1414, the first computer system enables establishment of a communication session with the first device and a second device associated with the third user account. For example, the first computer system causes the second computer system to establish the communication session by sending, to the second computer system, second data that corresponds to a communication session invitation and that comprises a third identifier of the third user account. The second data can also include the first identifier of the first account as a destination, whereas the third identifier is indicated as a source. Further, the second data can include the first token such that the second computer system can provide communication functionalities based on the first user account.

Figure 15:
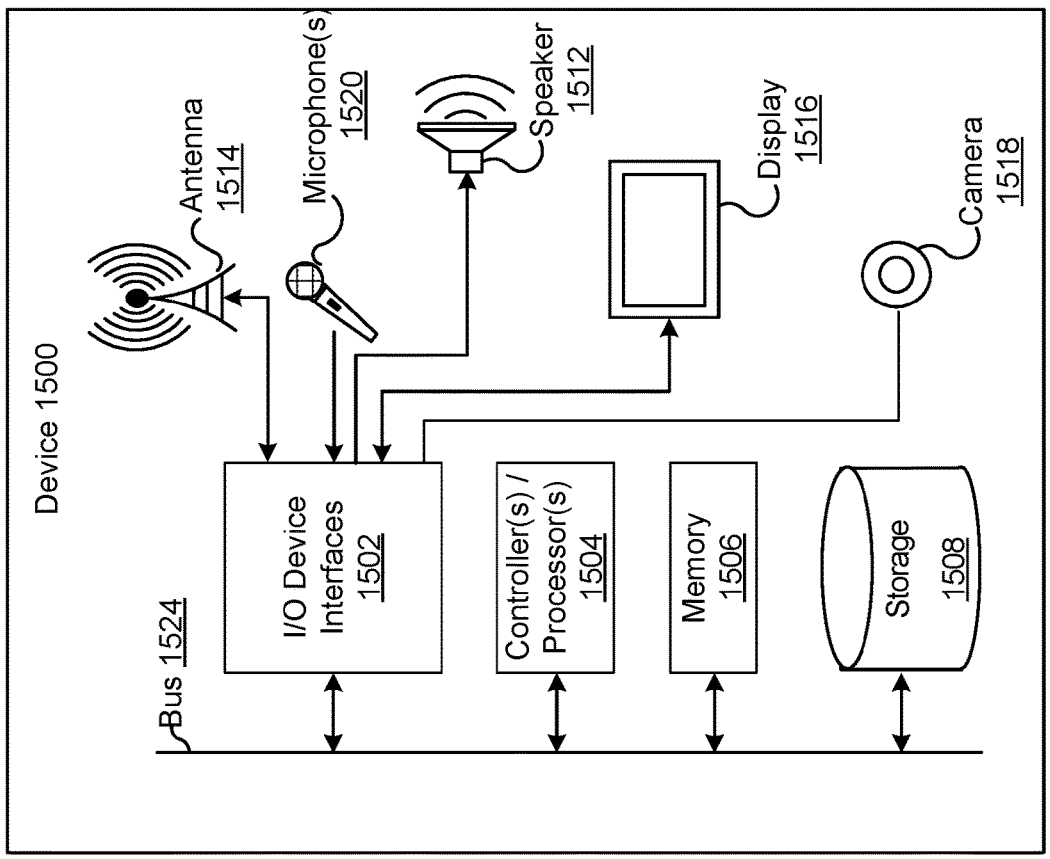
FIG. 15 illustrates an example of components of a device, in accordance with embodiments of the present disclosure.
Figure 16:
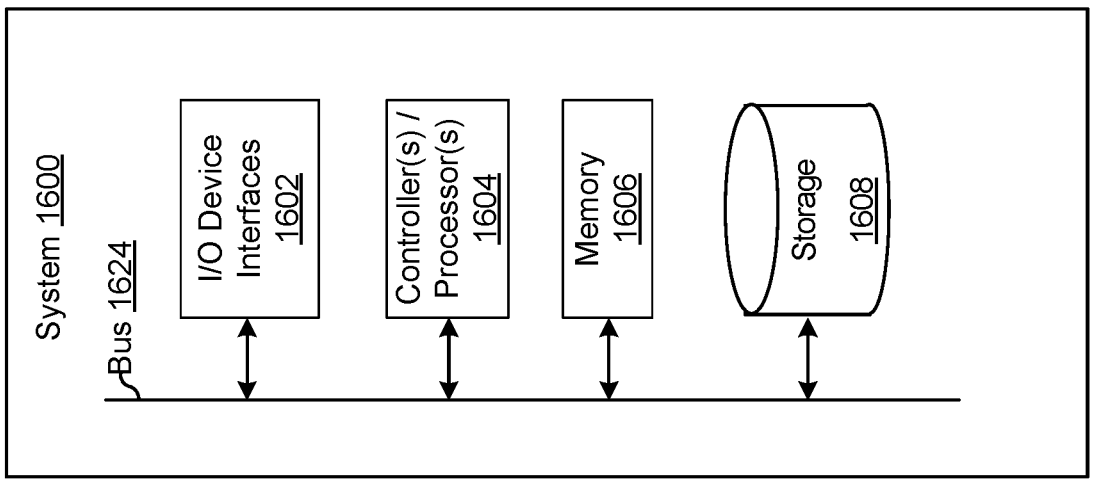
FIG. 16 illustrates an example of components of a computer system, in accordance with embodiments of the present disclosure.

FIG. 15 is a block diagram conceptually illustrating a device 1500 (e.g., the first device 1500 or the second device 240) that may be used in a system (e.g., the system 200). FIG. 16 is a block diagram conceptually illustrating example components of a computer system, such as the first computer system 220, which may assist with ASR processing, NLU processing, etc., and the second computer system 230. A computer system (220/230) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (220/230) may be included in the overall system 200 of the present disclosure, such as one or more NLP systems for performing ASR processing, one or more NLP systems for performing NLU processing, etc. In operation, each of these systems may include computer-readable and computer-executable instructions that reside on the respective computer system (220/230), as will be discussed further below.

Each of these devices (210/240) and computer system (220/230) may include one or more controllers/processors (1504/1604), which may each include a central processing unit (CPU) for processing data and computer-readable instructions, and a memory (1506/1606) for storing data and instructions of the respective device. The memories (1506/1606) may individually include volatile random-access memory (RAM), non-volatile read-only memory (ROM), non-volatile magnetoresistive memory (MRAM), and/or other types of memory. Each device (210/240) and computer system (220/230) may also include a data storage component (1508/1608) for storing data and controller/processor-executable instructions. Each data storage component (1508/1608) may individually include one or more non-volatile storage types, such as magnetic storage, optical storage, solid-state storage, etc. Each device (210/240) and computer system (220/230) may also be connected to removable or external non-volatile memory and/or storage (such as a removable memory card, memory key drive, networked storage, etc.) through respective input/output device interfaces (1502/1602).

Computer instructions for operating each device (210/240) and computer system (220/230) and its various components may be executed by the respective controller(s)/processor(s) (1504/1604), using the memory (1506/1606) as temporary "working" storage at runtime. Computer instructions may be stored in a non-transitory manner in non-volatile memory (1506/1606), storage (1508/1608), or an external device(s). Alternatively, some or all of the executable instructions may be embedded in hardware or firmware on the respective device in addition to or instead of software.

Each device (210/240) and computer system (220/230) may include input/output device interfaces (1502/1602). A variety of components may be connected through the input/output device interfaces (1502/1602), as will be discussed further below. Additionally, each device (210/240) and computer system (220/230) may include an address/data bus (1524/1624) for conveying data among components of the respective device. Each component within a device (210) may also be directly connected to other components in addition to (or instead of) being connected to other components across the bus (1524/1624).

Referring to FIG. 15, the device 1500 may include input/output device interfaces 1502 that connect to a variety of components, such as an audio output component such as a speaker 1512, a wired headset or a wireless headset (not illustrated), or other component capable of outputting audio. The device 1500 may also include an audio capture component. The audio capture component may be, for example, a microphone 1520 or array of microphones, a wired headset, or a wireless headset (not illustrated), etc. If an array of microphones is included, approximate distance to a sound's point of origin may be determined by acoustic localization based on time and amplitude differences between sounds captured by different microphones of the array. The device 1500 may additionally include a display 1516 for displaying content. The device 1500 may further include a camera 1518.

Via antenna(s) 1514, the input/output device interfaces 1502 may connect to one or more networks 199 via a wireless local area network (WLAN) (such as WiFi) radio, Bluetooth, and/or wireless network radio, such as a radio capable of communication with a wireless communication network, such as a Long Term Evolution (LTE) network, WiMAX network, 3G network, 4G network, 5G network, etc. A wired connection, such as Ethernet, may also be supported. Through network(s), the system may be distributed across a networked environment. The I/O device interface (1502/1602) may also include communication components that allow data to be exchanged between devices, such as different physical servers in a collection of servers or other components.

The components of each device (210/240) and computer system (220/230) may include their own dedicated processors, memory, and/or storage. Alternatively, one or more of the components of the device (210/240) and computer system (220/230) may utilize the I/O interfaces (1502/1602), processor(s) (1504/1604), memory (1506/1606), and/or storage (1508/1608) of the device (210/240) and computer system (220/230), respectively. Thus, an ASR component may have its own I/O interface(s), processor(s), memory, and/or storage; an NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 1500 and the computer system 1600, as described herein, are illustrative, and may be located as a stand-alone device or may be included, in whole or in part, as a component of a larger device or system.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture, such as a memory device or non-transitory computer-readable storage medium. The computer-readable storage medium may be readable by a computer and may comprise instructions for causing a computer or other device to perform processes described in the present disclosure. The computer-readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language, such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A first computer system comprising:
   at least one processor; and
   at least one memory storing instructions that, upon execution by the at least one processor, cause the first computer system to:
      receive, from a first device of a user, audio data that corresponds to a spoken natural language input of the user, the spoken natural language input requesting communications, the user associated with a first user account;
      perform speech processing on the audio data to execute an action in response to the audio data;
      determine that a second user account is to be generated for the user by a second computer system, the second computer system storing a third user account associated with a capability of performing the action;
      enable the second computer system to generate the second user account by at least sending first data to the second computer system, the first data comprising a first identifier of the first user account and a first access token associated with the first user account, the first access token comprising first authorization data to access the first user account on behalf of the user;
      receive, from the second computer system, the first access token and a second access token associated with the second user account, the second access token comprising second authorization data to access the second user account on behalf of the user;
      determine an authorization to store the second access token in the first user account, the authorization indicated by the first authorization data of the first access token;
      store, in the first user account, the second access token and a second identifier of the second user account;
      send, to the second computer system, the second access token;
      receive, from the second computer system based at least in part on the second access token, second data associated with a second device, the second data corresponding to a communication session invitation and comprising the first access token and a third identifier of the third user account; and
      enable establishment of a communication session with the first device and the second device.

2. The first computer system of claim 1, wherein the at least one memory stores further instructions that, upon execution by the at least one processor, further cause the first computer system to:
   generate, by using an authorization code grant type OAuth process, the first access token after determining that the second user account is to be generated; and
   cause the second computer system to associate the user first account and the second user account by at least sending the first identifier and the first access token to the second computer system.

3. The first computer system of claim 2, wherein the first access token is received from the second computer system by at least receiving third data that comprises the first access token and that corresponds to a first request to associate the first user account and the second user account, wherein the at least one memory stores additional instructions that, upon execution by the at least one processor, additionally cause the first computer system to:
   determine that the first access token included in the third data is associated with the first user account; and
   send, to the second computer system, fourth data corresponding to a second request for a reciprocal access token, wherein the second access token is received from the second computer system by at least receiving fourth data that comprises the second access token and that corresponds to a response to the second request.

4. A computer-implemented method comprising:
   receiving, from a first device, input data indicating that a communication session is requested, the input data associated with a first account of a user;
   determining that a second account of the user is to be used to establish the communication session;
   using a first access token associated with the first account to identify a second access token associated with the second account, the second access token comprising authorization data to access the second account on behalf of the user, the access to the second account enabling to facilitate use of the second account to establish the communication session;
   receiving first data associated with establishing the communication session, the first data indicating a third account to be used to establish the communication session; and
   enabling, based at least in part on the first data and the second access token, establishment of the communication session with the first device and a second device associated with the third account.

5. The computer-implemented method of claim 4, further comprising:
   generating the first access token based at least in part on the determining that the second account is to be used to establish the communication session; and
   enabling generation of the second account using second data, the second data indicating the first account and including the first access token in the first data.

6. The computer-implemented method of claim 5, further comprising:
   causing the second account to store the first access token by at least sending the second data and third data, wherein the third data is sent after the first data is sent and comprises an identifier of the first account and indicates that the communication session is to be established.

7. The computer-implemented method of claim 4, wherein the first access token is received by at least receiving second data that comprises the first access token and that corresponds to a first request to associate the first account with the second account, and further comprising:

generating third data that associates the first account and the second account based at least in part on the second data.

8. The computer-implemented method of claim 7, further comprising:

determining that the first access token included in the second data is associated with the first account; and sending fourth data that corresponds to a second request for a reciprocal access token, wherein the second access token is received by at least receiving fifth data comprising the second access token and corresponding to a response to the second request.

9. The computer-implemented method of claim 4, further comprising:

including a first identifier of the first account and the first access token in second data, wherein the second data enables generation of the second account; and sending third data indicating that the communication session is to be established and including the second access token.

10. The computer-implemented method of claim 4, further comprising:

causing the second account to store an association between the second account and the first account by at least sending the first access token and a first identifier of the first account; and determining, from the first data, the first identifier, the first access token, and a third identifier of the third account, wherein the first data corresponds to a communication session message and is received based at least in part on the association.

11. The computer-implemented method of claim 4, further comprising:

sending, based at least in part on a token-based association between the first account and the second account, second data that includes the second access token and that corresponds to a communication session message.

12. The computer-implemented method of claim 4, further comprising:

performing speech processing on the input data to determine a request for communications;

determining that the communication session is requested based at least in part on the request; and sending the second access token, wherein the first data is received based at least in part on the second access token.

13. A computer system comprising:

at least one processor; and at least one memory storing instructions that, upon execution by the at least one processor, cause the computer system to:

receive, from a first device, input data indicating that a communication session is requested, the input data associated with a first account of a user;

determine that a second account of the user is to be used to establish the communication session;

use a first access token associated with the first account to identify a second access token associated with the second account, the second access token comprising authorization data to access the second account on behalf of the user, the access to the second account enabling to facilitate use of the second account to establish the communication session;

receive first data associated with establishing the communication session, the first data indicating a third account to be used to establish the communication session; and enable, based at least in part on the first data and the second access token, establishment of the communication session with the first device and a second device associated with the third account.

14. The computer system of claim 13, wherein the establishment of the communication session is a first action, and wherein the at least one memory stores further instructions that, upon execution by the at least one processor, further cause the computer system to:

determine a request for a second action, the request associated with the first account;

determine that the second account is to perform the second action;

determine the second access token based at least in part on the first access token; and cause execution of the second action by at least sending second data, the second data comprising the second access token and indicating the second action.

15. The computer system of claim 13, wherein the at least one memory stores further instructions that, upon execution by the at least one processor, further cause the computer system to:

store second data that associates the first account and the second account, wherein the second data is stored by at least storing, in the first account, an identifier of the second account, the second access token, and a system identifier.

16. The computer system of claim 15, wherein the at least one memory stores further instructions that, upon execution by the at least one processor, further cause the computer system to:

store, in the first account, third data that indicates a first permitted use of the second access token in association with requesting one or more actions to be executed.

17. The computer system of claim 16, wherein the at least one memory stores additional instructions that, upon execution by the at least one processor, additionally cause the computer system to:

store, in the first account, the first access token, the first access token indicating a second permitted use of the first access token; and determine that establishing the communication session is permitted based at least in part on the first permitted use and the second permitted use.

18. The computer system of claim 13, wherein the input data corresponds to a request of a first user of the first account to communicate with a second user of the third account, wherein the second account is generated and associated with the first account further based at least in part on the request, and wherein the communication session is established further based at least in part on the request.

19. The computer system of claim 13, wherein the establishment of the communication session and the input data are a first action and first input data, respectively, and wherein the at least one memory stores further instructions that, upon execution by the at least one processor, further cause the computer system to:

receive, from the first device, second input data indicating that a second action is requested, the second input data associated with the first account;

determine that the second account is to perform the second action; and cause execution of the second action by at least sending second data, the second data comprising the second access token and indicating the second action.

20. The computer system of claim 13, wherein the first account is registered with the computer system, wherein the second account is registered with a different computer system, and wherein the authorization data indicates access controls for a first resource of computer system to access a second resource of the different computer system.

* * * * *